United States Patent
Li et al.

(10) Patent No.: US 9,619,362 B2
(45) Date of Patent: Apr. 11, 2017

(54) EVENT SEQUENCE CONSTRUCTION OF EVENT-DRIVEN SOFTWARE BY COMBINATIONAL COMPUTATIONS

(71) Applicant: FUJITSU LIMITED, Kawasaki-shi, Kanagawa (JP)

(72) Inventors: Guodong Li, San Jose, CA (US); Indradeep Ghosh, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 14/546,956

(22) Filed: Nov. 18, 2014

(65) Prior Publication Data
US 2016/0140016 A1 May 19, 2016

(51) Int. Cl.
*G06F 11/00* (2006.01)
*G06F 11/36* (2006.01)

(52) U.S. Cl.
CPC ...... *G06F 11/3612* (2013.01); *G06F 11/3664* (2013.01); *G06F 11/3668* (2013.01)

(58) Field of Classification Search
CPC .. G06F 11/3612; G06F 11/3664; G06F 11/36; G06F 11/3604; G06F 11/3608; G06F 11/3668; G06F 11/3672; G06F 11/3688
USPC ................ 714/55, 25, 35, 38.1, 37, 47.1, 51
See application file for complete search history.

(56) References Cited

U.S. PATENT DOCUMENTS

| | | | |
|---|---|---|---|
| 8,683,494 B1 | 3/2014 | Prasad et al. | |
| 2005/0166179 A1* | 7/2005 | Vronay | G06Q 10/00 717/105 |
| 2006/0036910 A1* | 2/2006 | Fung | G06F 11/3672 714/25 |
| 2011/0179386 A1* | 7/2011 | Shaffer | G06F 3/04883 715/835 |
| 2013/0326485 A1 | 12/2013 | Ghosh et al. | |
| 2014/0164364 A1* | 6/2014 | Cosgrove | G06F 17/3053 707/723 |

OTHER PUBLICATIONS

Pacheco, C., Lahiri, S. K., Ernst, M. D., and Ball, T. Feedback-directed random test generation. 29th International Conference on Software Engineering (ICSE'07).
Artzi, S., Dolby, J., Jensen, S. H., Moller, A., and Tip, F. A framework for automated testing of JavaScript Web applications. ICSE May 21-28, 2011.

* cited by examiner

*Primary Examiner* — Joseph D Manoskey
(74) *Attorney, Agent, or Firm* — Maschoff Brennan

(57) ABSTRACT

According to an aspect of an embodiment, a method may include determining event sequences of an event-driven software application. The method may further include determining, for each event sequence, a distance with respect to each of one or more target conditions of the event-driven software application. The event sequence distance may indicate a degree to which execution of its corresponding event sequence satisfies a corresponding target condition. The method may also include prioritizing execution of the plurality of event sequences based on the event sequence distances. Further, the method may include exploring, according to the prioritization of execution, an event space that includes one or more of the event sequences and a dependent event that corresponds to the one or more target conditions.

20 Claims, 12 Drawing Sheets

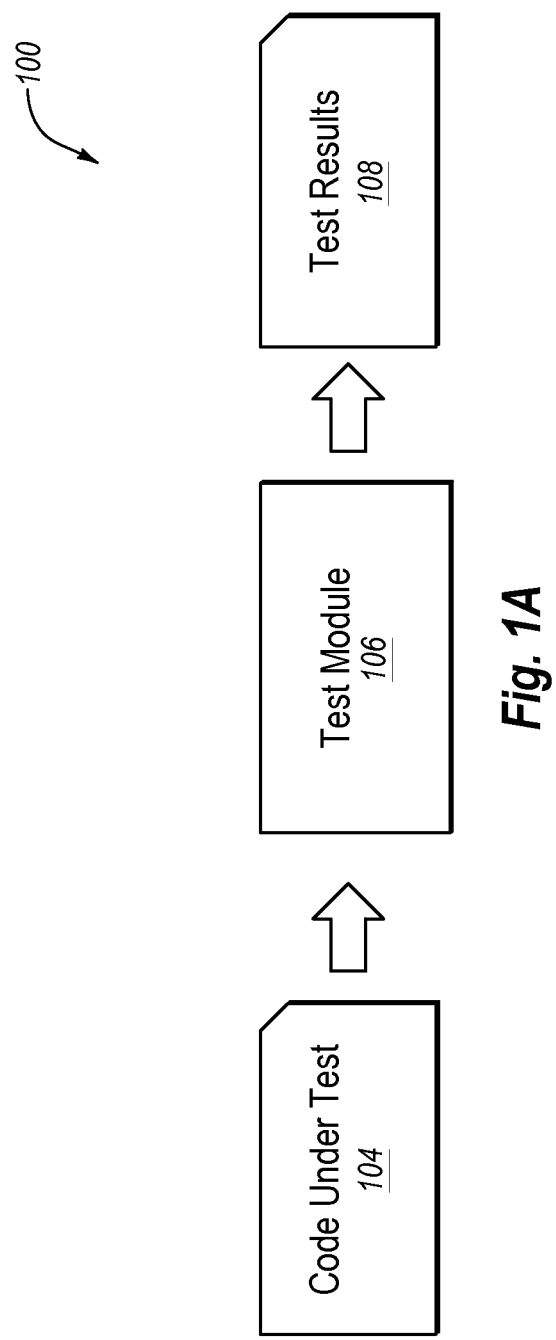

EVENT SEQUENCE CONSTRUCTION OF EVENT-DRIVEN SOFTWARE BY COMBINATIONAL COMPUTATIONS

FIELD

The embodiments discussed herein are related to constructing event sequences of event-driven software.

BACKGROUND

Testing software, such as validating or verifying software, is a common activity among information technology (IT) organizations. For example, whether the software is a desktop application for execution at one or more client computer systems, mobile device application for execution on a mobile device, or a Web application for execution at one or more server computer systems, it is often important to verify the quality of the software. While some types of errors in software cause only annoyance or inconvenience to users, other types of errors have the potential to cause other problems, such as data and financial loss.

One type of software that is becoming more ubiquitous is event-driven software such as graphical user interface (GUI) based applications and Web based applications. In event-driven software, the flow of the software may be determined by events such as user actions (mouse clicks, key presses), sensor outputs, or messages from other programs/threads. Event-driven software may have a large number of different events and corresponding event sequences that may be explored during testing. Often, a large number of events and event sequences may create an event sequence explosion. The event sequence explosion may result in the testing of the event-driven software being time consuming and/or resource intensive. In some instances, the amount of processing required from an event sequence explosion may be prohibitive in performing the testing.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include determining event sequences of an event-driven software application. The method may further include determining, for each event sequence, a distance with respect to each of one or more target conditions of the event-driven software application. The event sequence distance may indicate a degree to which execution of its corresponding event sequence satisfies a corresponding target condition. The method may also include prioritizing execution of the plurality of event sequences based on the event sequence distances. Further, the method may include exploring, according to the prioritization of execution, an event space that includes one or more of the event sequences and a dependent event that corresponds to the one or more target conditions.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1A is a diagram representing an example system configured to test software;

DESCRIPTION OF EMBODIMENTS

Figure 1B:
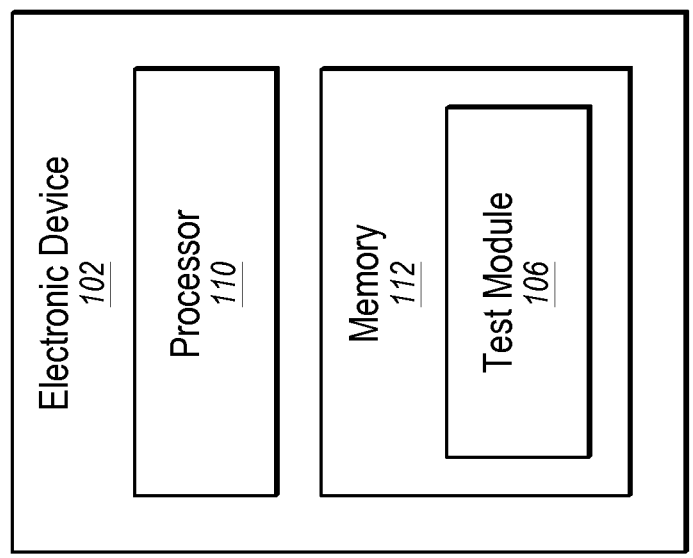
FIG. 1B illustrates an example electronic device that may include a test module configured to test software.

Some embodiments described herein relate to methods and systems of testing event-driven software applications, such as graphical user interface (GUI) based applications for electronic devices and Web based applications. The flow of event-driven software applications may be determined by different "events" such as user actions (mouse clicks, key presses), sensor outputs, or messages from other programs/threads. Event-driven software applications may have a large number of different events and corresponding event sequences that may be explored during testing, which may lead to an event sequence explosion problem when analyzing the event-driven software applications.

As detailed below, an event sequence distance may be determined for each of multiple initial event sequences of an event-driven software application with respect to one or more target conditions of a dependent event of the initial event sequences. For multiple dependent events, each of them may be considered separately. The event sequence distances may indicate a degree to which execution of their corresponding initial event sequences may come to satisfying a corresponding target condition. Explanations of distances and their calculations are given in further detail below.

In some embodiments, execution of the initial event sequences may be prioritized based on the event sequence distances. Further, an event space that includes one or more of the initial event sequences and a dependent event may be explored based on the prioritization of execution. The prioritization may allow for determining which event sequences may satisfy the target conditions with an increased efficiency over other methods of doing so. For example, such a process may allow for exploration of portions of the event-driven software that correspond to satisfaction of the target conditions in a manner that may reduce the number of event sequences that may be explored otherwise. Therefore, problems associated with event sequence explosion may be at least partially avoided.

Embodiments of the present disclosure are explained with reference to the accompanying drawings.

FIG. 1A is a diagram representing an example system 100 configured to test event-driven software, arranged in accordance with at least one embodiment described herein. The system 100 may include a test module 106 configured to perform testing with respect to code under test 104 of an event-driven software application to generate test results 108 of the event-driven software application. The code under test 104 may include electronic data, such as, for example, the event-driven software application, code of the event-driven software application, libraries, applications, scripts, or other logic or instructions for execution by a processing device. In some embodiments, the code under test 104 may include a complete instance of the event-driven software application. Additionally or alternatively, the code under test 104 may include a portion of the event-driven software application. The code under test 104 may be written in any suitable type of computer language that may be used for event-driven software applications.

The code under test 104 may include portions of the software program organized into a number of software modules. The software modules may include code that performs specific functionalities of the software modules. Code that performs specific functionalities may be referred to as software functions. In some embodiments, the code under test 104 may execute one or more software functions in response to an occurrence of an event associated with the event-driven application. For example, the code under test 104 may include a software function "f1(a)" that may perform operations with respect to a variable "a" in response to an event sequence "e1."

As detailed below, the test module 106 may be configured to perform a series of operations with respect to the code under test 104 that may help with exploring and testing the code under test 104. For example, the test module 106 may be configured to determine initial event sequences of the code under test 104. The initial event sequences may include sequences of one or more events that may be used as a launch point in exploring the code under test 104. In some embodiments, the initial event sequences may include the events that may be available for opening or initializing the code under test 104. Additionally or alternatively, the initial event sequences may include events that may be available upon opening or initialing the code under test 104. Moreover, during the execution of the application, events that may be newly discovered with respect to a particular state of the code under test 104 may be included as extra initial events for the particular state. The above are merely examples of initial event sequences. The term "initial event sequences" may include any set of event sequences that may be used as a launch point in exploring the code under test 104, as described in detail below. The test module 106 may be configured to determine the initial event sequences using any acceptable routine, method, or process.

The test module 106 may also be configured to determine one or more dependent events that may depend on one or more of the initial events. An event may be considered a dependent event of another event (e.g., an initial event) when it includes a path condition that depends from a variable that may correspond to the other event. For example, a first event may write a value to a variable and a second event may have a path condition that may be based on the value of the variable. As such, in this example, the second event and its corresponding path condition may depend from the first event. In some embodiments, the first event may depend from the second event while the second event depends from the first event at the same time. Further, an event may depend from itself as well.

In some embodiments, the test module 106 may be configured to identify the path conditions of the dependent events and to match the variables associated with the path conditions with the variables associated with the initial event sequences to determine which events depend on which initial event sequences. In some embodiments, the paths associated with the path conditions of the dependent events may not have been explored yet such that that the path conditions may be referred to as "target conditions," in that the path conditions with unexplored paths may be targeted such that the unexplored paths may be explored.

The test module 106 may be configured to determine one or more event sequences that when executed may satisfy the target conditions such that the associated paths of the target conditions may be explored. For example, the test module 106 may first identify particular initial event sequences that may correspond to a particular dependent event. The test module 106 may then be configured to determine a distance for each of the particular initial event sequences with respect to one or more target conditions of the particular dependent event. Determination of distances is given in detail below. The distance for each particular initial event sequence may indicate a degree to which execution of the particular event sequence is to satisfying the corresponding target condition.

For example, a particular target condition may include the following condition "when i=3." Further, execution of a first event sequence may result in "i=4," execution of a second event sequence may result in "i=5," and execution of a third event sequence may result in "i=3." Execution of the third event sequence may be deemed as satisfying the particular target condition to a higher degree than execution of the first or second event sequences in that execution of the third event sequence may satisfy the particular target condition. Additionally, execution of the first event sequence may be deemed as satisfying the particular target condition to a higher degree than execution of the second event sequence in that the value of "i" after execution of the first event sequence (e.g., "4") may be closer to a target value of "i" associated with the particular target condition (e.g., "3") than the value of "i" after execution of the second event sequence (e.g., "5"). A first distance ("d1") of the first event sequence with respect to the particular target condition, a second distance ("d2") of the second event sequence with respect to the particular target condition, and a third distance ("d3") of the third event sequence with respect to the particular target condition may indicate the different degrees of satisfaction of the particular target condition by the first, second, and third event sequences, respectively.

For instance, the first distance ("d1") may be determined as the difference between the target value of "i" and the value of "i" after executing the first event sequence (e.g., "d1=|3−4|=1"). Additionally, the second distance ("d2") may be determined as the difference between the target value of "i" and the value of "i" after executing the second event sequence (e.g., "d2=|3−5|=2"). Further, the third distance ("d3") may be determined as the difference between the target value of "i" and the value of "i" after executing the third event sequence (e.g., "d3=|3−3|=0").

Therefore, in this particular example, in general, a lower value for the distances may indicate a smaller difference between the target value of "i" and the value of "i" after execution of the corresponding event sequence. Further, a value of "0" for a distance may indicate that the target value for "i" is met in this particular example. As such, the values of the third distance "d3", the first distance "d1," and the second distance "d2" may indicate that execution of the third event sequence may satisfy the particular target condition to a higher degree than execution of the first event sequence or the second event sequence. Further, the values of the first distance "d1" and the second distance "d2" in this particular example may indicate that execution of the first event sequence may satisfy the particular target condition to a higher degree than execution of the second event sequence. Additionally, the value of the third distance "d3" in this particular example may indicate that execution of the third event sequence may satisfy the particular target condition.

The test module 106 may be configured to prioritize execution of the particular initial event sequences based on the distances. The test module 106 may be configured to explore an event space of the code under test 104 that includes the particular dependent event and one or more of the particular initial event sequences based on the prioritization of execution of the particular event sequences. For example, in some embodiments, the test module 106 may execute the particular initial event sequence with the smallest distance first based on particular initial event sequences with smaller distances being prioritized for execution over particular initial event sequences with larger distances. Further detail regarding examples of how the test module 106 may perform the prioritization and exploration is given below. As indicated above, the prioritization may allow for the test module 106 to determine which event sequences may satisfy the target conditions with an increased efficiency over other methods of doing so.

In some embodiments, the test module 106 may be configured to produce test results 108 from testing the code under test 104. In some embodiments, the test results 108 may indicate event sequences that may satisfy one or more of the target conditions. For example, in some embodiments, the test results 108 may include an event sequence tree that may provide a graphical illustration of which event sequences may satisfy which target conditions.

FIG. 1B illustrates an example electronic device 102 that may include the test module 106, according to at least one embodiment described herein. The electronic device 102 may include any suitable system, apparatus, or device configured to test the code under test 104 using the test module 106. The electronic device 102 may include a processor 110 communicatively coupled to a memory 112. In some embodiments, the test module 106 may be embodied in logic or instructions resident in the memory 112 for execution by the processor 110.

The processor 110 may include any suitable special-purpose or general-purpose computer, computing entity, or processing device including various computer hardware or software modules and may be configured to execute instructions stored on any applicable computer-readable storage media. For example, the processor 110 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 1B, it is understood that the processor 110 may include any number of processors configured to perform individually or collectively any number of operations described herein. Additionally, one or more of the processors may be present on one or more different electronic devices. In some embodiments, the processor 110 may interpret and/or execute program instructions and/or process data stored in the memory 112.

The memory 112 may include computer-readable storage media for carrying or having computer-executable instructions or data structures stored thereon. Such computer-readable storage media may be any available media that may be accessed by a general-purpose or special-purpose computer, such as the processor 110. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 110 to perform a certain function or group of functions.

The test module 106 may include instructions and data configured to cause the processor 110 to perform the testing of the code under test 104. Accordingly, in some embodiments, the electronic device 102 may incorporate the test module 106 in the memory 112 as illustrated in FIG. 1B.

Figure 2:
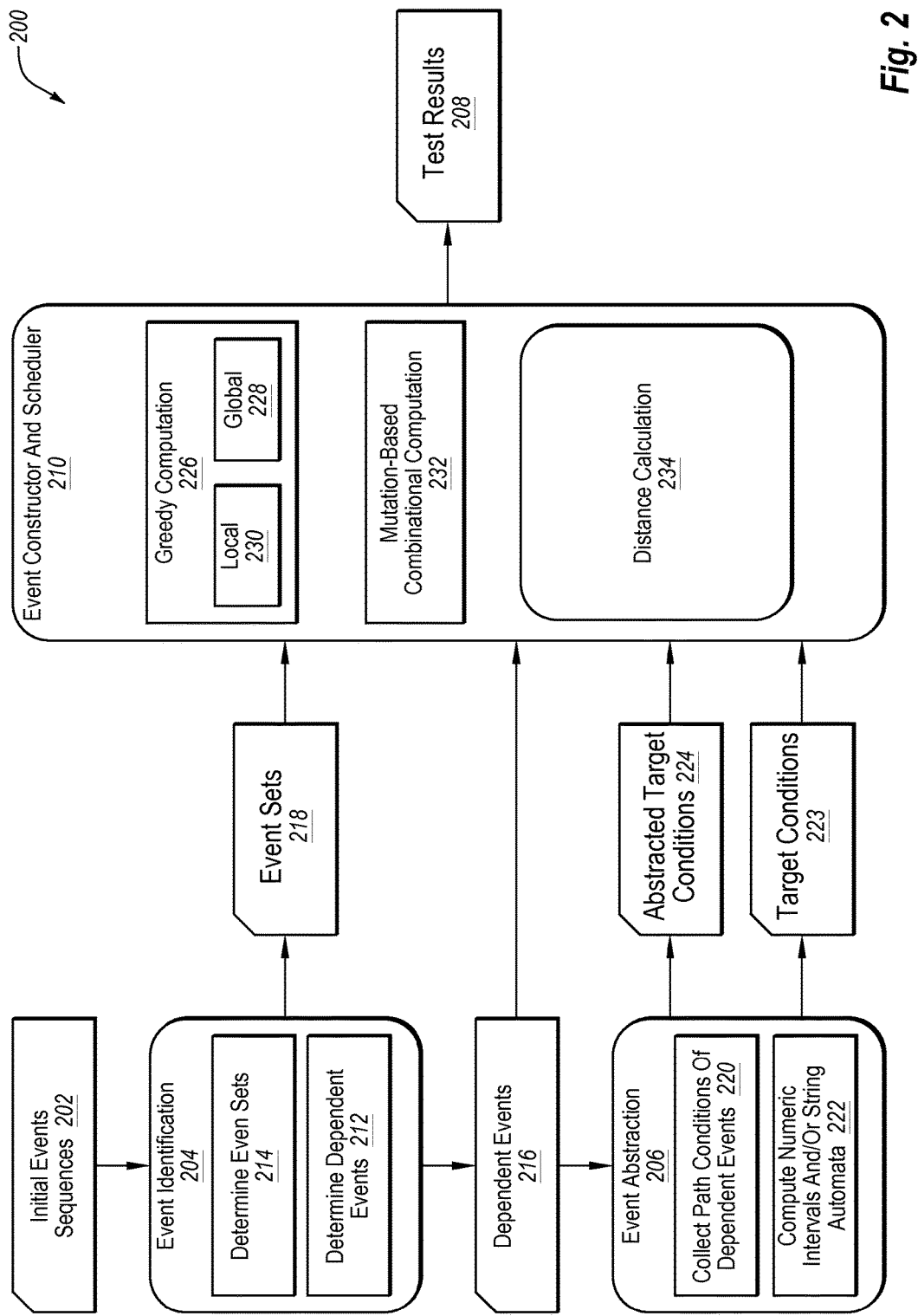
FIG. 2 is a diagram of an example flow that may be used with respect to testing event-driven software applications.

FIG. 2 is a diagram of an example flow 200 that may be performed with respect to testing event-driven software applications, according to at least one embodiment described herein. The flow 200 may be performed by any suitable system, apparatus, or device. For example, the test module 106 of the electronic device 102 of FIG. 1B may perform one or more of the operations associated with the flow 200. Although illustrated with discrete blocks and phases, the steps and operations associated with one or more of the blocks or phases of the flow 200 may be divided into additional blocks or phases, combined into fewer blocks or phases, or eliminated, depending on the implementation.

The flow 200 may be performed with respect to one or more portions of an event-driven software application that may act as code under test, such as the code under test 104 of FIG. 1A. In some embodiments, the flow 200 may begin by receiving one or more initial event sequences 202 that may be associated with the code under test. The initial event sequences 202 may be included in an event space of the code under test. The initial event sequences 202 may include an event or a sequence of events that may be obtained from a parser or an interpreter of the code-under test. Event sequences discovered dynamically during execution of the code under test may also be considered as initial event sequences 202 in some instances. For instance, initial event sequences 202 of a Web application along with their associated source code may be retrieved from a Web browser.

In the illustrated embodiment, the flow 200 may include an event identification phase 204, an event abstraction phase 206, and an event constructor and scheduler phase 210

(referred to hereinafter as the "constructor phase 210"). The event identification phase 204, the event abstraction phase 206, and the constructor phase 210 may be configured to perform operations with respect to the initial event sequences 202 and the associated code under test to output test results 208, which may be analogous to the test results 108 described above with respect to FIG. 1A. As described in detail below, operations associated with the event identification phase 204, the event abstraction phase 206, and the constructor phase 210 may be performed to allow for and explore the event space of the code under test such that execution of event sequences during the exploration may be prioritized according to distances.

The event identification phase 204 may include a block 212 that may correspond to operations associated with determining one or more dependent events 216 with respect to one or more of the initial event sequences 202. For example, in some embodiments, one or more events that are not included in the initial event sequences 202, that have not been explored yet, and that may be reached by executing one or more of the initial event sequences 202 may be identified as new initial events 202, among which dependent events with unexplored path conditions are identified—

In some embodiments, block 212 may include operations associated with correlating the dependent events 216 with corresponding initial event sequences 202. For example, variables written by the initial event sequences 202 may be compared with variables that may be part of one or more path conditions associated with the dependent events 216 to determine which dependent events 216 may depend from which initial event sequences 202.

In some embodiments, the event identification phase 204 may include a block 214 that may correspond to operations associated with determining one or more event sets 218 of the initial event sequences 202. The event sets 218 may each include one or more initial event sequences 202 that share a same dependent event. For example, a first initial event sequence may write to a first variable that may be associated with a path condition of a particular dependent event. Additionally, a second initial event sequence may write to a second variable that may also be associated with the path condition, or another path condition, of the particular dependent event. For this particular example, the first initial event sequence and the second initial event sequence may be included in the same event set 218 because the particular dependent event 216 may depend from both of them.

The event abstraction phase 206 may include operations associated with performing abstractions with respect to the dependent events 216 that may be determined in the event identification phase 204. For example, the event abstraction phase 206 may include a block 220 that may correspond to operations associated with collecting path conditions of the dependent events 216. The dependent events 216 may each include one or more path conditions that when satisfied may result in the code under test performing operations associated with the corresponding dependent event 216.

For example, a path condition of a particular dependent event 216 may include an "If" statement, or the like, associated with one or more values of one more variables, that when satisfied, may result in reaching a bug or security vulnerability when executing the particular dependent event 216. The determined path conditions may be identified as target conditions 223 that may include conditions associated with numeric or string variables. A path condition or target condition that may be based on a numeric variable may be referred to as a "numeric condition" and a path condition or target condition that may be based on a string variable may be referred to as a "string condition."

The event abstraction phase 206 may also include a block 222 that may correspond to operations associated with computing numeric intervals associated with numeric conditions of the target conditions of the dependent events 216. In some embodiments, the numeric intervals may be determined based on corresponding symbolic conditions that may be abstracted into intervals. The symbolic conditions for the target conditions may be determined using any suitable technique.

In particular, a numeric condition may have a corresponding symbolic path condition that may be based on one or more ranges of values associated with one or more numeric variables. The symbolic path condition may then be converted into one or more interval unions. By way of example, a symbolic path condition "0≤i≤1 ∨i>5" of a numeric (e.g., an integer) condition may be converted into the following interval union: "i ∈[0,1]∪[6, ∞]." As another example, a symbolic path condition "i*j>9∧ i>2" of a numeric condition may be converted into the following interval union: "i*j∈ [10,∞]∧i∈[3,∞]." The numeric conditions and their associated intervals may be included in a set of abstracted target conditions 224 that may be determined during the event abstraction phase 206.

The path condition of a numeric condition may involve multiple numeric variables. This condition may then be converted into the union of multi-dimensional boxes. By way of example, a symbolic path condition "0≤i≤10∧2j< i∧j>1" of an integer condition may be converted into the following 2-d box union: "i∈[5,10]∧j∈[2, 4]." More complicated models can be used to increase the accuracy when estimating possible values of multiple variables with respect to the path condition.

The block 222 may also correspond to operations associated with computing string automata associated with string conditions of the target conditions of the dependent events 216. In some embodiments, a finite state machine (FSM) may be generated as a string automata that may represent a string condition. The string conditions and their associated string automata may be included in the set of abstracted target conditions 224 that may be determined during the event abstraction phase 206.

Figure 3:
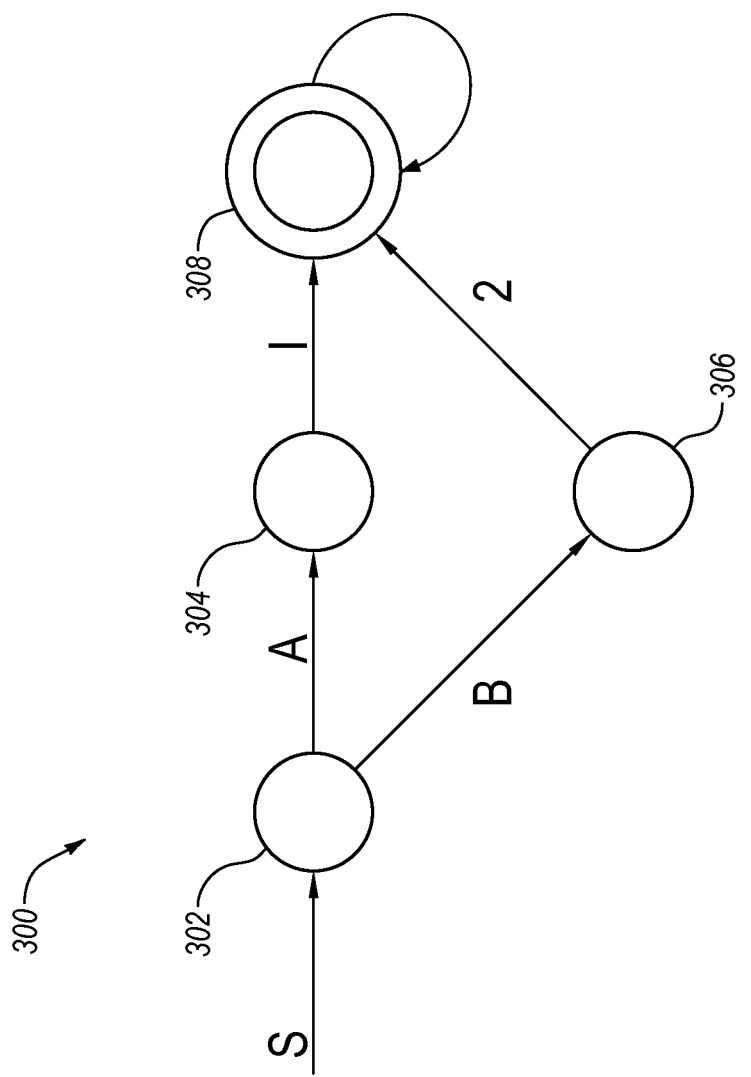
FIG. 3 is an illustration of an example embodiment of a graph of a Finite State Machine that may be used to represent a string condition.

For example, FIG. 3 is an illustration of an example embodiment of a graph of an FSM 300 that may be used to represent a string condition, according to at least one embodiment. An intermediate state in the FSM 300 may be represented by a single circle, an accepting state (e.g., a state where the string condition may be satisfied) of the FSM 300 may be represented by a double circle, and an input to a state of the FSM 300 may be represented by an arrow leading to the corresponding circle.

In the illustrated example, the FSM 300 may represent a string condition "s.startsWith('A1') ∨s.startsWith('B2')" that may be satisfied by a string that starts with either the string "A1" or the string "B2." In particular, in the illustrated example, the FSM 300 may include a beginning state 302, a first intermediate state 304, a second intermediate state 306, and an accept state 308.

The beginning state 302 may represent the string "s" when it has no characters assigned to it (e.g., when it is empty). The first intermediate state 304 may be reached from the beginning state 302 when the first character of "s" is an "A." The accept state 308 may be reached from the first intermediate state 304 when the character following "A" is "1" because the condition "s.startsWith('A1')" may be satisfied in this instance.

The second intermediate state 306 may be reached from the beginning state 302 when the first character of "s" is a "B." Note that when "s=B," "B" may be the first and last character of "s" and when "s=B*," where "*" represents any character, "B" is the first character of "s," followed by any character. The accept state 308 may be reached from the second intermediate state 306 when the character following "B" is a "2."

The FSM 300 is merely an example of an FSM that may be generated for a particular string condition. Any number of different FSMs may be generated for any number of different string conditions. Further examples and description of representing strings and string conditions with FSMs may be found in U.S. patent application Ser. No. 13/482,598 filed on May 29, 2012, the entire contents of which are incorporated herein by reference.

Returning to FIG. 2, the constructor phase 210 may include operations associated with generating test results 208 based on the event sets 218 and the dependent events 216 determined during the event identification phase 204. The constructor phase 210 may include operations associated with generating the test results 208 based on the target conditions 223 and the corresponding abstracted target conditions 224 that may be determined during the event abstraction phase 206. As indicated above, in some embodiments, the test results 208 may include event sequences that may satisfy one or more of the target conditions of the dependent events 216. In these or other embodiments, the test results 208 may include one or more event sequence trees that may also illustrate the satisfaction of the target conditions by the event sequences.

In some embodiments, the test results 208 may be determined based on operations performed at a block 226 associated with a search-based combinational computation referred to as a "Greedy Computation." The Greedy Computation may include operations that may be performed to determine which sequences of events may satisfy the target conditions of the abstracted target conditions 224. The operations performed with respect to the Greedy Computation may be performed with respect to a particular event set 218 and particular abstracted target conditions 224 that may correspond to the particular event set 218. Therefore, the operations associated with the Greedy Computation may be performed discretely with respect to different event sets 218 and corresponding abstracted target conditions 224. The Greedy Computation may be used to perform exploration of the code under test according to prioritization of event sequences based on distances indicated above. Therefore, Greedy Computation may be performed such that execution of event sequences during exploration of the event space of the code under test may be prioritized according to the distances.

In some embodiments, the Greedy Computation may initialize by starting with a particular event set 218 and its corresponding target conditions 223 and abstracted target conditions 224. The Greedy Computation may also include calculating a distance for one or more event sequences of the particular event set 218 and the corresponding target conditions 223. In some embodiments, the distance may be determined at a distance calculation block 234 of the constructor phase 210. The distance may indicate a degree to which execution of the corresponding event sequence satisfies the corresponding target conditions 223.

The following is an example of computing distance of a particular event sequence with respect to a corresponding particular numeric condition of the target conditions 223. The particular numeric condition may have a corresponding abstracted target condition 224 that may include an interval with an upper bound "ub" and a lower bound "lb" for a value "v" where if the value "v" is between the upper bound "ub" and the lower bound "lb", the particular numeric condition may be satisfied. Additionally, the value "v" may be associated with a value of one or more variables that may have values changed when a particular event sequence is executed. By way of example, the value "v" may be based on the value of an integer "i" that may be changed when the particular event sequence is executed. As another example, the value "v" may be based on the product of the value of an integer "i" with the value of an integer "j" (e.g., "v=i*j") that may both be changed when the particular event sequence is executed.

The distance of the particular event sequence with respect to the particular numeric condition may be the lesser of the difference between the upper bound "ub" and the value "v" and the difference between the lower bound "lb" and the value "v" if the particular event sequence were to be executed. Further, in some embodiments, the distance may be determined to be "0" when the value "v" would be between the lower bound "lb" and the upper bound "ub" if the particular event sequence were to be executed. For example, the distance of the value "v" to an interval "[lb, ub]" may be expressed as follows:

$$d([lb, ub], v) = \begin{cases} 0 & \text{if } lb \leq v \leq ub \\ \min(|v - lb|, |v - ub|) & \text{otherwise} \end{cases}$$

Additionally or alternatively, when the particular numeric condition includes multiple intervals, the distance may be determined for each interval and the lesser of the distances may be used as the distance. Further, in some embodiments, the value "v" may be initialized at "0" before a distance determination is made.

By way of example, the abstracted target condition 224 associated with the particular numeric condition may be defined as "i∈[0,1]∪[6, ∞]" and execution of the particular event sequence may result in a value "v" of "i" being "3." Therefore, the distance of the particular event sequence with respect to the particular numeric condition may be determined as "min(|3−1|,|6−3|)=2."

The following is an example of computing distance of the particular event sequence with respect to a corresponding particular string condition of the target conditions 223. The distance of the particular event sequence with respect to the particular string condition may be determined by determining a number of transitions a string may be from the nearest accept state of a corresponding FSM of an abstracted target condition 224 that corresponds to the particular string condition after execution of the particular event sequence.

For example, the particular string condition may include the string condition "s.startsWith('A1') ∨s.startsWiths('B2')," which may be represented by the FSM 300 of FIG. 3 of the corresponding abstracted target condition 224. Additionally, execution of the particular event sequence may result in the string "s" being assigned one or more characters. The distance may indicate a number of transitions to reach the nearest accept state for the string "s" if the particular event sequence were to be executed. For example, with respect to the FSM 300, if execution of the particular event sequence were to result in "s=A1" the distance of the particular event sequence with respect to the particular string condition may be determined as "0" because the condition "s.startsWith('A1')" may be met such that the FSM 300 may be in the accept state 308.

As another example, with respect to the FSM 300, if execution of the particular event sequence were to result in "s='B'" the distance of the particular event sequence with respect to the particular string condition may be determined as "1" because the FSM 300 may be in the second intermediate state 306 and the number of transitions to reach the accept state 308 may be one.

As yet another example, with respect to the FSM 300, if execution of the particular event sequence were to result in "s='C12'" the distance of the particular event sequence with respect to the particular string condition may be determined as "2" because the FSM 300 may be in the beginning state 302 and the number of transitions to reach the accept state 308 may be two.

Returning to block 226, in some embodiments, the Greedy Computation may include a global implementation and/or a local implementation. The global implementation of the Greedy Computation may include a global search-based combinational computation and may be referred to as the "Global Computation." Associated operations of the "Global Computation" may be performed at block 228. The local implementation of the Greedy Computation may include a local search-based combinational computation and may be referred to as the "Local Computation." Associated operations of the Local Computation may be performed at block 230.

Figure 4:
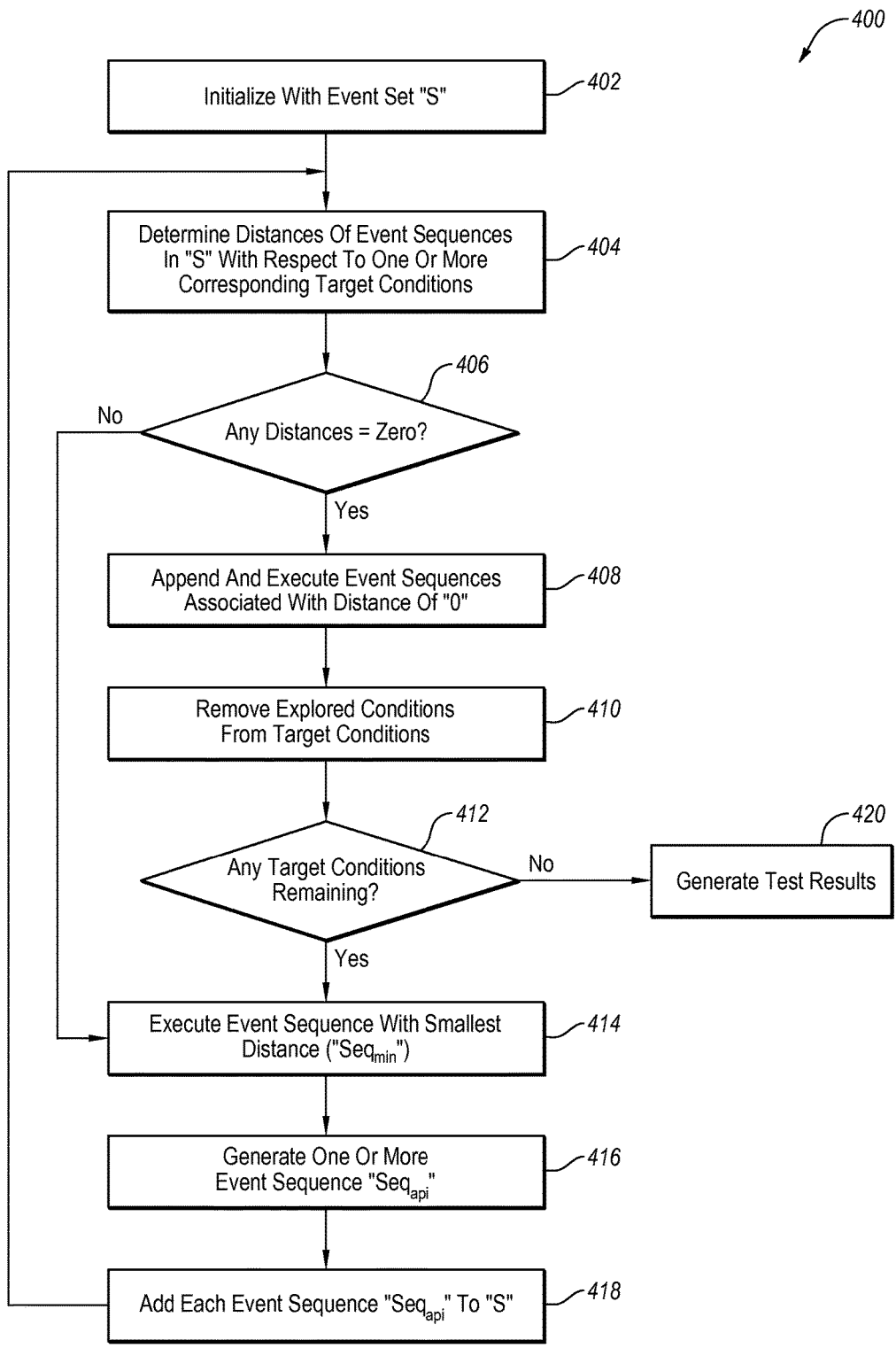
FIG. 4 is a flowchart of an example method of performing a Global Computation.

FIG. 4 is a flowchart of an example method 400 of performing the Global Computation, according to at least one embodiment described herein. In some embodiments, one or more of the operations associated with the method 400 may be performed at block 228 of the flow 200. The method 400 may be performed by any suitable system, apparatus, or device. For example, the test module 106 of the electronic device 102 of FIG. 1B may perform one or more of the operations associated with the method 400. Although illustrated with discrete blocks, the steps and operations associated with one or more of the blocks of the method 400 may be divided into additional blocks, combined into fewer blocks, or eliminated, depending on the desired implementation.

The method 400 may begin at block 402 where the Global Computation may be initialized with an event set "S." In some embodiments, the event set "S" may include an event set where each of the event sequences of the event set "S" may share a same dependent event ("corresponding dependent event"). In some embodiments, the corresponding dependent event may be included with the initialization of the event set "S." The corresponding dependent event may include one or more path conditions that may be considered target conditions. Moreover, in some embodiments, the target conditions may be associated with abstracted target conditions.

Figure 5A:
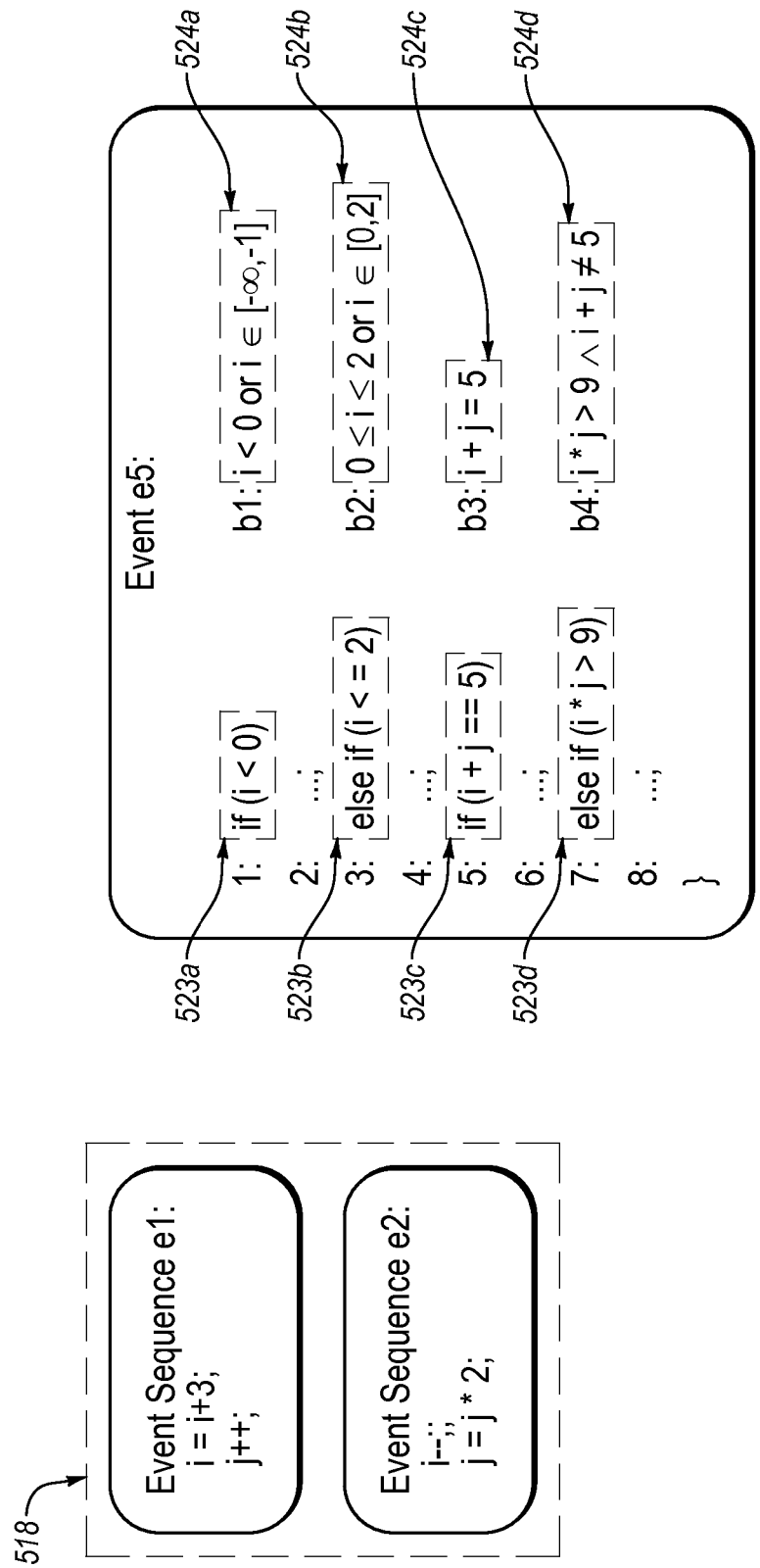
FIG. 5A illustrates an example event set.

By way of example, FIG. 5A illustrates an event set 518 that may be used for the event set "S," according to at least one embodiment described herein. The event set 518 may include an event sequence "e1" and an event sequence "e2." As illustrated in the example, event sequences "e1" and "e2" may write to integer variables "i" and "j." FIG. 5A also illustrates a dependent event "e5." The dependent event "e5" may include unexplored path conditions (referred to as "target conditions") 523a, 523b, 523c, and 523d.

Satisfaction of the target condition 523a may be based on a value of "i" and may allow for exploration of a path (also referred to as a "branch" in some instances) "$b1_5$" associated with the dependent event "e5." Satisfaction of the target condition 523b may be based on a value "j" and may allow for exploration of a path "$b2_5$" associated with the dependent event "e5." Satisfaction of the target condition 523c may be based on values of both "i" and "j" and may allow for exploration of a path "$b3_5$" associated with the dependent event "e5." Further, satisfaction of the target condition 523d may be based on values of both "i" and "j" and may allow for exploration of a path "$b4_5$" associated with the dependent event "e5." Because satisfaction of the target conditions 523 may depend on values of "i" and/or "j" and event sequences "e1" and "e2" may write to "i" and "j," the dependent event "e5" may depend on the event sequences "e1" and "e2." The dependent event "e5" may accordingly be considered a corresponding dependent event of the event sequences "e1" and "e2."

Additionally, in the illustrated example, the target conditions 523 may each be associated with an abstracted target condition 524. For example, the target condition 523a may be associated with an abstracted target condition 524a, the target condition 523b may be associated with an abstracted target condition 524b, the target condition 523c may be associated with an abstracted target condition 524c, and the target condition 523d may be associated with an abstracted target condition 524d. Further, the target conditions 523 and the abstracted target conditions 524 may be considered numeric conditions because the variables "i" and "j" may be integers. Therefore, as indicated above, the abstracted target conditions 524 may define intervals for "i" and/or "j" such that a corresponding path "$bk_5$" (e.g., "$b1_5$," "$b2_5$," "$b3_5$," or "$b4_5$") may be explored.

Figure 6A:
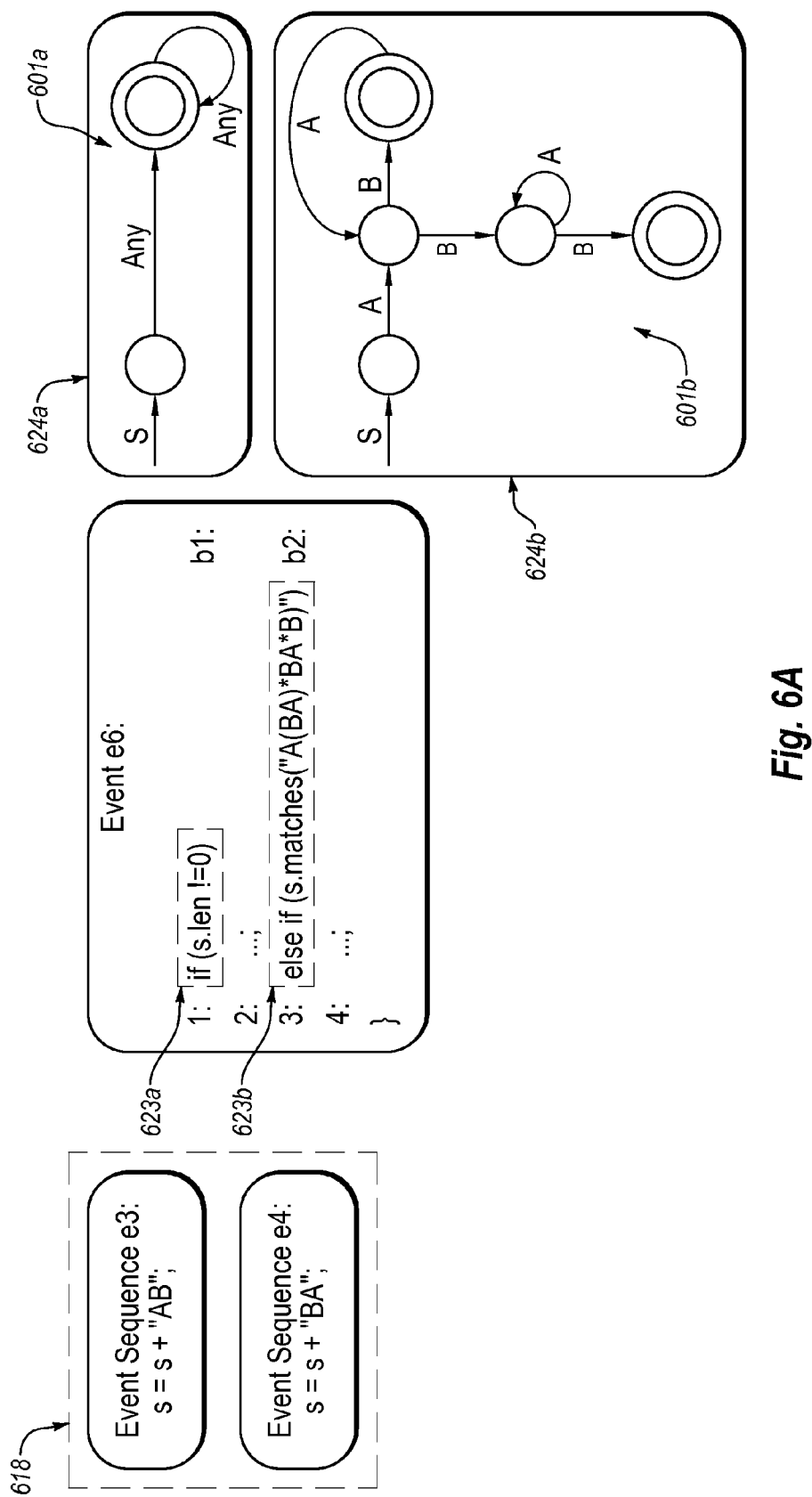
FIG. 6A illustrates another example event set.

As another example, FIG. 6A illustrates an event set 618 that may be used for the event set "S," according to at least one embodiment described herein. The event set 618 may include an event sequence "e3" and an event sequence "e4." As illustrated in the example, event sequences "e3" and "e4" may write to a string variable "s." FIG. 6A also illustrates a dependent event "e6." The dependent event "e6" may include unexplored path conditions (referred to as "target conditions") 623a and 623b.

Satisfaction of the target condition 623a may be based on the content of "s" and may allow for exploration of a path "$b1_6$" associated with the dependent event "e6." Additionally, satisfaction of the target condition 623a may be based on the content of "s" and may allow for exploration of a path "$b2_6$" associated with the dependent event "e6." Because satisfaction of the target conditions 623 may depend on the content of "s" and events sequences "e3" and "e4" may write to "s," the dependent event "e6" may depend on the event sequences "e3" and "e4." The dependent event "e6" may accordingly be considered a corresponding dependent event of the event sequences "e3" and "e4."

Additionally, in the illustrated example, the target conditions 623 may each be associated with an abstracted target condition 624. For example, the target condition 623a may be associated with an abstracted target condition 624a and the target condition 623b may be associated with an abstracted target condition 624b. Further, in the illustrated example, the target conditions 623 and the abstracted target conditions 624 may be considered string conditions because the variable "s" may be a string. Therefore, as indicated above, the abstracted target condition 624a may include an FSM 601a that may represent the target condition 623a and that may indicate how to reach the path "$b1_6$." Similarly, the abstracted target condition 624b may include an FSM 601b that may represent the target condition 623b and that may indicate how to reach the path "$b1_6$."

The event sequences "e1," "e2," "e3," and "e4" of FIGS. 5A and 6A may be examples of the initial event sequences 202 of FIG. 2. Further, the event sets 518 and 618 may be examples of the event sets 218 that may be divided from the initial event sequences 202 based on operations that may be performed with respect to block 214 described with respect to FIG. 2. Further, the abstracted target conditions 524 and 624 may be examples of the abstracted target conditions 224 of FIG. 2. Additionally, the dependent events "e5" and "e6" may be examples of the dependent events 216 of FIG. 2.

Returning to FIG. 4, at block 404, the distances of the event sequences of the event set "S" may be determined with respect to one or more corresponding target conditions. The corresponding target conditions may include unexplored path conditions of the corresponding dependent event. In some embodiments, the distances may be determined based on abstracted target conditions 224 of the corresponding target conditions as described with respect to the distance calculation block 234 of FIG. 2.

For example, in some embodiments, distances may be determined for event sequences "e1" and "e2" of FIG. 5A with respect to the target conditions 523a-523b based on the abstracted target conditions 524a-524b, respectively. In the illustrated example, the initial values of variables "i" and "j" may be assumed to be "0". These values are updated during event sequence execution, and are used for distance determination. Table 1 illustrates the distances that may be determined for event sequences "e1" and "e2." Additionally, in Table 1, the rows may be associated with the event sequences and the columns may be associated with the corresponding target conditions. The numbers in the cells may indicate the distance of the event of the corresponding row with respect to the target condition of the corresponding column. As an example, after the execution of the event sequence "e1," the values of i and j are 3 and 1 respectively, and its distance to target condition 523d is |3×1−10|=7.

TABLE 1

|  | Target Condition 523a | Target Condition 523b | Target Condition 523c | Target Condition 523d |
| --- | --- | --- | --- | --- |
| e1 | 4 | 1 | 1 | 7 |
| e2 | 0 | 3 | 6 | 10 |

As another example, distances may be determined for events sequences "e3" and "e4" of FIG. 6A with respect to the target conditions 623a and 623b based on the abstracted target conditions 624a and 624b, respectively. In the illustrated example, the variable "s" may be set as being empty before the execution. Table 2 illustrates the distances that may be determined for event sequences "e3" and "e4." Additionally, in Table 2, the rows may be associated with the event sequences and the columns may be associated with the corresponding target conditions. The numbers in the cells may indicate the distance of the event of the corresponding row with respect to the target condition of the corresponding column.

TABLE 2

|  | Target Condition 623a | Target Condition 623b |
| --- | --- | --- |
| e3 | 0 | 1 |
| e4 | 0 | 3 |

At block 406, it may be determined if any of the event sequences have a distance of "0" with respect to a corresponding target condition. When one or more event sequences have a distance of "0," the method 400 may proceed to block 408; otherwise, the method 400 may proceed to block 414.

At block 408, one or more of the event sequences with a distance of "0" with respect to a corresponding target condition may be appended with the corresponding dependent event and the resulting event sequence may be executed. Such execution may allow for the path associated with the corresponding target condition to be encountered and explored. In some embodiments, the executed event sequence may be considered a discovered event sequence that may be deemed as "covering" the path associated with the corresponding target (or path) condition. As indicated below, in some embodiments, one or more discovered event sequences may be included in test results associated with the event set "S." Additionally, by executing the event sequences with a distance of "0," the execution and exploration may be prioritized according to distances that indicate a higher degree of satisfaction as compared to distances that indicate a lower degree of satisfaction.

For example, with respect to the example of FIG. 5A and Table 1, the event sequence "e2" may be appended with the dependent event "e5" and the resulting event sequence ("e2→e5") may be executed, which may allow for exploration of the path "$b1_5$." In some embodiments, the event sequence "e2→e5" may thus be deemed a discovered event sequence with respect to the event set 518 and may be included in test results associated with the event set 518. Additionally, the event sequence "e2→e5" may be deemed as covering the path "$b1_5$."

As another example, with respect to the example of FIG. 6A and Table 2, the event sequence "e3" may be appended with the dependent event "e6" and the resulting event sequence ("e3→e6") may be executed, which may allow for exploration of the path "$b1_6$." Additionally or alternatively, the event sequence "e4" may be appended with the dependent event "e6" and the resulting event sequence ("e4→e6") may be executed, which may also allow for exploration of the path "$b1_6$." In some embodiments, the event sequence "e4→e6" may thus be deemed a discovered event sequence with respect to the event set 618 and may be included in test results associated with the event set 618. Additionally, the event sequence "e4→e6" may be deemed as covering the path "$b1_6$."

At block 410, explored path conditions may be removed from the target conditions. Explored conditions may include the target conditions that are associated with distances of "0" whose corresponding paths may be encountered and/or explored in response to execution of the event sequences associated with the operations associated with block 406.

For example, with respect to the example of FIG. 5A and Table 1, the target condition 523a may be considered an "explored condition" and may be removed from a set of target conditions that may have previously included the target conditions 523a-523d. Therefore, with respect to this particular example and iteration, the set of target conditions may include target conditions 523b-523d following block 410. As another example, with respect to the example of FIG. 6A and Table 2, the target condition 623a may be considered an "explored condition" and may be removed from a set of target conditions that may have previously included the target conditions 623a and 623b. Therefore, with respect to this particular example and iteration, the set of target conditions may include target condition 623b following block 410.

At block 412, it may be determined whether any target conditions associated with the corresponding dependent event are remaining. When target conditions are remaining, the method 400 may proceed to block 414. When no more target conditions are remaining, the method 400 may proceed to block 420.

In some embodiments, no more remaining target conditions may indicate that event sequences that satisfy all the target conditions of the corresponding dependent event may have been discovered. Therefore, in some embodiments, test results (e.g., the test results 208) may be generated at block 420. In some embodiments, the discovered event sequences that may satisfy the target conditions may be included in the test results. Additionally or alternatively, in some embodiments, the test results may include one or more event sequence trees that may also illustrate the satisfaction of the target conditions by the discovered event sequences.

At block 414, an event sequence "$Seq_{min}$" of the event set "S" that is associated with a smallest non-zero distance may be executed. In some instances, more than one event sequence may be associated with the same smallest non-zero distance. In these or other embodiments, any one of the event sequences may be executed. By executing the event sequence "$Seq_{min}$" the execution and exploration may be prioritized according to distances that indicate a higher degree of satisfaction as compared to distances that indicate a lower degree of satisfaction. Therefore, execution of the event sequence "$Seq_{min}$" may be prioritized according to its distance indicating that execution of the event sequence "$Seq_{min}$" is satisfies the target condition to a higher degree than other event sequences of the event set "S."

By way of example, with respect to the example of FIG. 5A and Table 1, the smallest non-zero distance associated with the event sequence "e1" may be "1" and the smallest non-zero distance associated with the event sequence "e2" may be "3". Therefore, for this particular example, the event sequence "e1" may be considered "$Seq_{min}$" and may be executed at block 414. As another example, with respect to the example of FIG. 6A and Table 2, the smallest non-zero distance associated with the event sequence "e3" may be "1" and the smallest non-zero distance associated with the event sequence "e4" may be "3". Therefore, for this particular example, the event sequence "e3" may be considered "$Seq_{min}$" and may be executed at block 414.

At block 416, each singular event sequence (e.g., a sequence with only one event) of the event set "S" may be appended to the event sequence "$Seq_{min}$" determined at block 414 to generate one or more event sequences "$Seq_{api}$." For example, with respect to the example of FIG. 5A and Table 1, the event set "S" may include the singular event sequences "e1" and "e2" and the event sequence "e1" may be "$Seq_{min}$." Therefore, in this particular example, the event sequence "e1" may be appended with singular event sequences "e1" and "e2" to generate event sequences "e1→e1" and "e1→e2," which may be designated as event sequences "$Seq_{ap1}$" and "$Seq_{ap2}$," respectively. As another example, with respect to the example of FIG. 6A and Table 2, the event set "S" may include the singular event sequences "e3" and "e4" and the event sequence "e3" may be "$Seq_{min}$." Therefore, in this particular example, the singular event sequence "e3" may be appended with event sequences "e3" and "e4" to generate event sequences "e3→e3" and "e3→e4," which may be designated as event sequences "$Seq_{ap1}$" and "$Seq_{ap2}$," respectively.

At block 418, the event sequences "$Seq_{api}$" may be added to the event set "S." For example, with respect to the example of FIG. 5A and Table 1, the event set 518 may be considered the event set "S" and may include the event sequences "e1" and "e2." Further, the event sequences "$Seq_{api}$" in this particular example and iteration may include "e1→e1" and "e1→e2." Therefore, for this particular example and iteration, the event sequences "e1→e1" and "e1→e2" may be added to the event set 518 such that the event set 518 may include the event sequences "e1," "e2," "e1→e1," and "e1→e2" following block 412. As another example, with respect to the example of FIG. 6A and Table 2, the event set 618 may be considered the event set "5" and may include the event sequences "e3" and "e4." Further, the event sequences "$Seq_{api}$" in this particular example and iteration may include "e3→e3" and "e3→e4." Therefore, for this particular example and iteration, the event sequences "e3→e3" and "e3→e4" may be added to the event set 618 such that the event set 618 may include the event sequences "e3," "e4," "e3→e3," and "e3→e4" following block 412.

Following block 418, the method 400 may return to block 404. In some embodiments, the method 400 may repeat the operations of one or more of blocks 404, 406, 408, 410, 412, 414, 416, and 418 for the event set "5" until there are no more target conditions remaining such that the method 400 may proceed to block 420 as described above.

As an example, distances may be determined for events sequences "e1" and "e2" of FIG. 5A, and the new sequences "e1→e1" and "e1→e2" with respect to the target conditions 523b to 523d. Table 3 illustrates the distances that may be determined for these event sequences. Since event sequence "e1→e2" has the smallest distance ("0"), this sequence may be considered "$Seq_{min}$" and may be executed at block 414.

TABLE 3

|  | Target Condition 523b | Target Condition 523c | Target Condition 523d |
|---|---|---|---|
| e1 | 1 | 1 | 7 |
| e1 | 1 | 1 | 7 |
| e1→e1 | 4 | 3 | 2 |
| e1→e2 | 0 | 1 | 6 |

Therefore, the operations of one or more of blocks 404, 406, 408, 410, 412, 414, 416, and 418 may be repeated until one or more event sequences that may satisfy the target conditions associated with the corresponding dependent event of the event set "S" have been discovered. For example, with respect to the example of FIG. 5A and Table 1, the operations of one or more of blocks 404, 406, 408, 410, 412, 414, 416, and 418 may be repeated for the event set 518 until event sequences have been discovered that may satisfy the target conditions 523a-523d of the dependent event "e5." As indicated above, when event sequences have been discovered that may satisfy the target conditions 523a-523d, the method 400 may proceed to block 420 to generate corresponding test results that may indicate discovered event sequences that may cover paths "$b1_5$"-"$b4_5$." As indicated above, an event sequence that may allow for encountering and exploring a particular path by satisfying a corresponding path condition of the particular path may be deemed as "covering" the particular path.

Figure 5B:
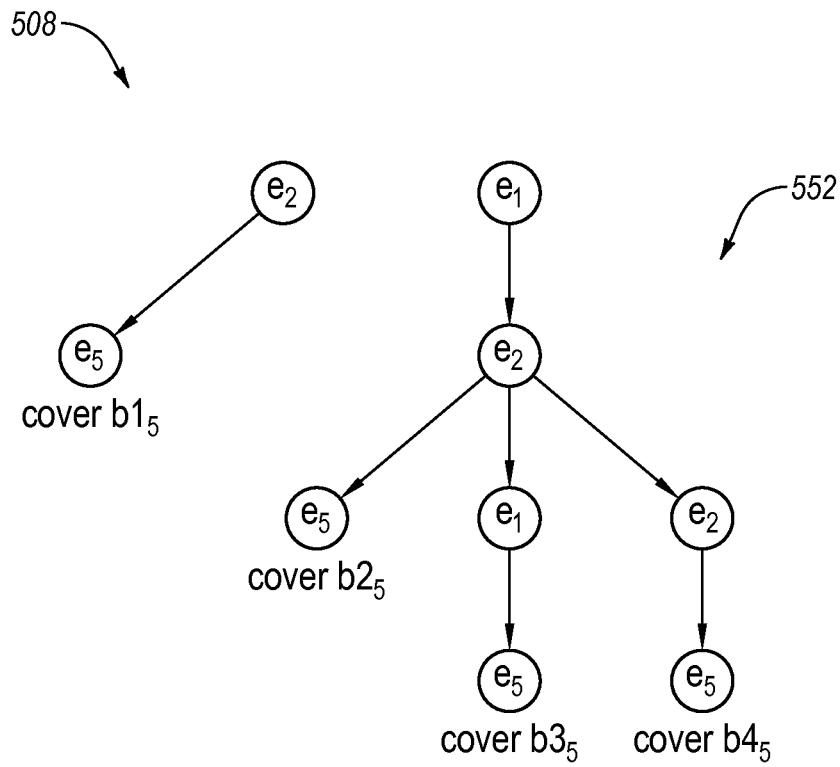
FIG. 5B illustrates example test results associated with the event set of FIG. 5A.
Figure 5B:
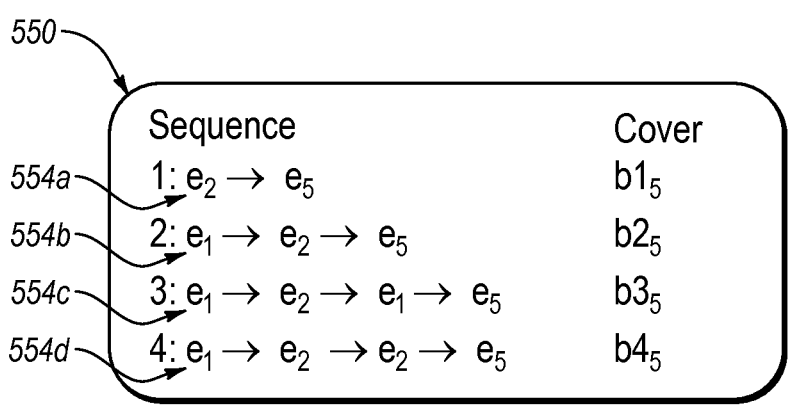

FIG. 5B illustrates example test results 508 associated with the event set 518, according to at least one embodiment described herein. The test results 508 may be generated at block 420 and may also be an example of the test results 208. In some embodiments, the test results 508 may include a discovered event sequence set 550 and/or a corresponding event sequence tree 552.

The discovered event sequence set 550 may include discovered event sequences 554a, 554b, 554c, and 554d. The discovered event sequence 554a may indicate the event sequence that may cover the path "b1₅," the discovered event sequence 554b may indicate the event sequence that may cover the path "b2₅," the discovered event sequence 554c may indicate the event sequence that may cover the path "b3₅," and the discovered event sequence 554d may indicate the event sequence that may cover the path "b4₅." The event sequence tree 552 may illustrate the discovered event sequences 554 in a graphical form.

As another example, with respect to the example of FIG. 6A and Table 2, the operations of one or more of blocks 404, 406, 408, 410, 412, 414, 416, and 418 may be repeated for the event set 618 until event sequences have been discovered that may satisfy the target conditions 623a and 623b of the dependent event "e6." As indicated above, when event sequences have been discovered that may satisfy the target conditions 623a and 623b, the method 400 may proceed to block 420 to generate corresponding test results that may indicate discovered event sequences that may cover paths "b1₆" and "b2₆."

Figure 6B:
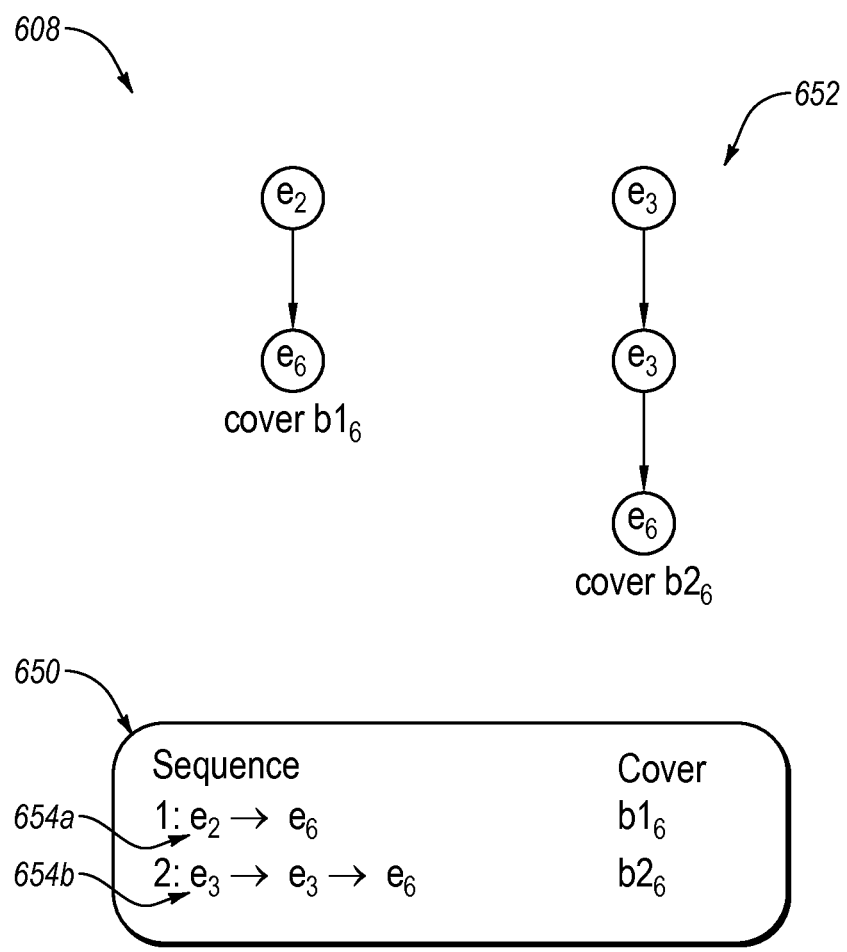
FIG. 6B illustrates example test results associated with the event set of FIG. 6A.

FIG. 6B illustrates example test results 608 associated with the event set 618, according to at least one embodiment described herein. The test results 608 may be generated at block 420 and may also be an example of the test results 208. In some embodiments, the test results 608 may include a discovered event sequence set 650 and/or a corresponding event sequence tree 652.

The discovered event sequence set 650 may include discovered event sequences 654a and 654b. The discovered event sequence 654a may indicate the event sequence that may cover the path "b1₆" and the discovered event sequence 654b may indicate the event sequence that may cover the path "b2₆." The event sequence tree 652 may illustrate the discovered event sequences 554 in a graphical form.

Therefore, the method 400 may be performed to explore the event space of the code under test such that execution of event sequences during the exploration may be prioritized according to distances, which may increase the efficiency of determining discovered event sequences as compared to other methods. Modifications, additions, or omissions may be made to the method 400 without departing from the scope of the present disclosure. For example, in some instances, the method 400 may be configured to terminate after a particular number of iterations have been performed even if an event sequence that covers a path of a corresponding target condition has not been found for all the target conditions.

Additionally, a particular event sequence with a distance of "0" in the present description indicates that execution of the particular event sequence may satisfy the corresponding target condition. Further, in the above description the lower the number associated with the distance the higher degree an event sequence may satisfy the corresponding target condition. However, different methodologies for determining distance may be used where numbers or another metric may not follow the same rules. As such, the operations associated with distances of "0" described above may be modified to accommodate whatever distance criteria that may indicate a degree of satisfaction of a particular target condition. Additionally or alternatively, operations associated with smallest distance may be modified to accommodate whatever distance criteria that may indicate that one event sequence may satisfy a particular target condition to a higher degree than another event sequence.

Returning to FIG. 2, as mentioned above the "Local Computation" and associated operations may be performed at block 230 of the flow 200. As illustrated below, the Local Computation may differ from the Global Computation in that an event set may not be added to in the Local Computation. Such an implementation may allow for the Local Computation to be performed faster than the Global Computation.

Figure 7:
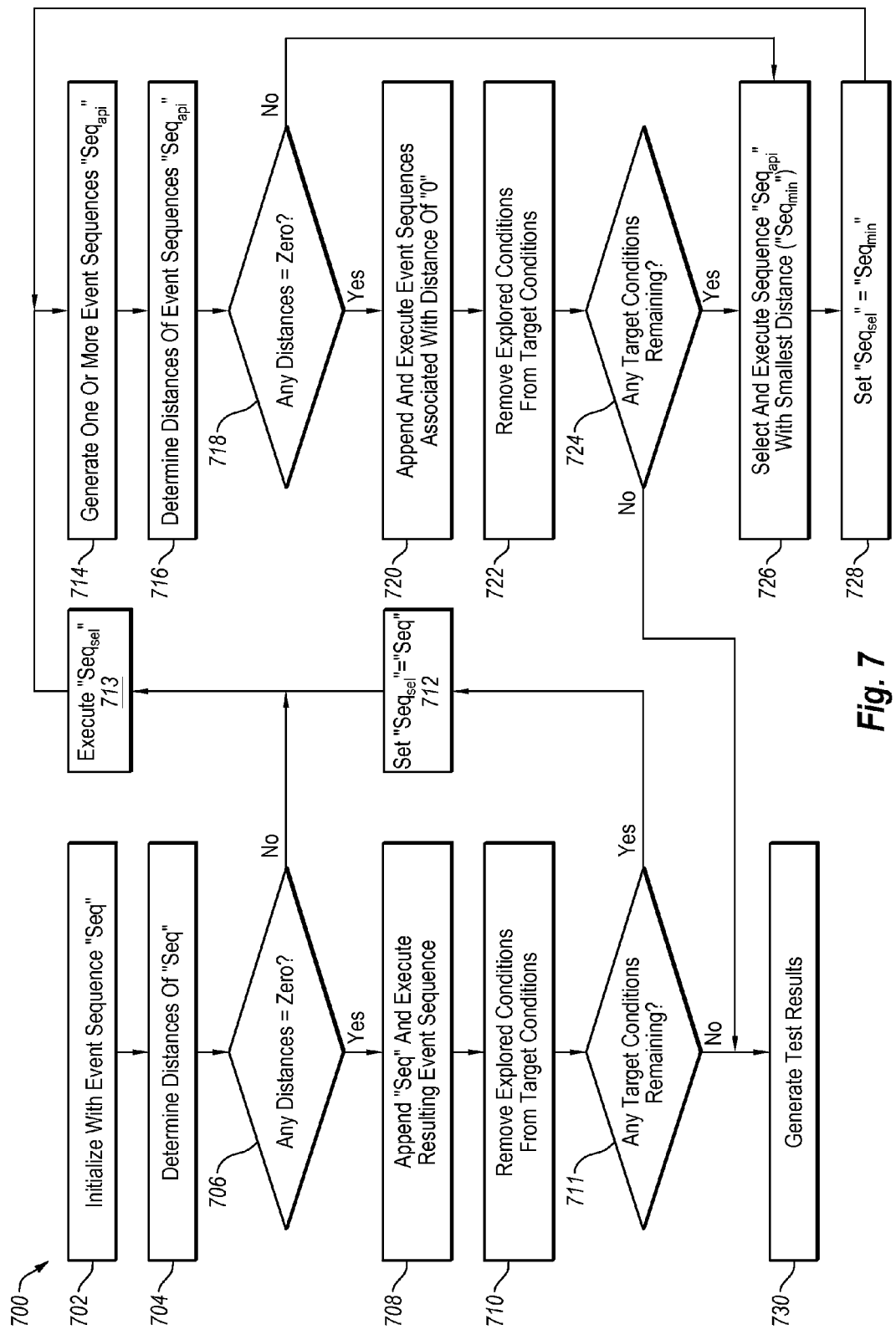
FIG. 7 is a flowchart of an example method 700 of performing a Local Computation.

FIG. 7 is a flowchart of an example method 700 of performing the Local Computation, according to at least one embodiment described herein. In some embodiments, one or more of the operations associated with the method 700 may be performed at block 230 of the flow 200. The method 700 may be performed by any suitable system, apparatus, or device. For example, the test module 106 of the electronic device 102 of FIG. 1B may perform one or more of the operations associated with the method 700. Although illustrated with discrete blocks, the steps and operations associated with one or more of the blocks of the method 700 may be divided into additional blocks, combined into fewer blocks, or eliminated, depending on the desired implementation.

The method 700 may begin at block 702 where the Local Computation may be initialized with an event sequence "Seq" such that the Local Computation may use the event sequence "Seq" as a starting point. In some embodiments, the event sequence "Seq" may be selected from an event set "S." For example, with respect to the example given with respect to FIGS. 5A and 5B, event sequence "e1" or event sequence "e2" may be selected as "Seq" from the event set 518.

In some embodiments, one or more operations associated with blocks 402, 404, 406, 408, 410, 412, and 414 of method 400 of FIG. 4 may be performed with respect to block 702 to select the event sequence "Seq." By performing the operations associated with these blocks of method 400, one or more event sequences of the event set "5" may be determined to be discovered event sequences that may cover one or more paths associated with the target conditions. Therefore, one or more target conditions may be removed before performing more operations with respect to method 700, which may improve the efficiency of the method 700.

At block 704, one or more distances may be determined for the event sequence "Seq" with respect to one or more target conditions of a corresponding dependent event that may be associated with the event set "S." For example, with respect to the example given with respect to FIGS. 5A and 5B, when the event sequence "e1" is selected as "Seq," distances may be determined for the event sequence "e1" with respect to the target conditions 523a-523d. Conversely, when the event sequence "e2" is selected as "Seq," distances may be determined for the event sequence "e2" with respect to the target conditions 523a-523d. As indicated above, the first row of Table 1 listed above may indicate the distances that may be determined for the event sequence "e1" with respect to the target conditions 523a-523d. Additionally, second row of Table 1 listed above may indicate the distances that may be determined for the event sequence "e2" with respect to the target conditions 523a-523d.

At block 706, it may be determined whether any of the distances of the event sequence "Seq" with respect to the target conditions are equal to "0." When one or more of the distances are equal to "0," the method 700 may proceed to block 708; otherwise, the method 700 may proceed to block 714.

At block 708, the event sequence "Seq" may be appended with the corresponding dependent event and the resulting event sequence may be executed. Similar to as described above with respect to block 408 of method 400 of FIG. 4, the resulting event sequence may be considered a discovered event sequence that may cover the path that may correspond to the target condition associated with the distance of "0." At block 710, explored path conditions may be removed from the target conditions. As indicated above, the explored path conditions may include any target conditions that may be associated with a distance of "0" with respect to the event sequence "Seq."

At block 711, it may be determined whether any target conditions associated with the corresponding dependent event are remaining. When target conditions are remaining, the method 700 may proceed to block 712. When no more target conditions are remaining, the method 700 may proceed to block 730.

As described above, in some embodiments, no more remaining target conditions may indicate that event sequences that satisfy all the target conditions of the corresponding dependent event may have been discovered. Therefore, in some embodiments, test results (e.g., the test results 208) may be generated at block 730. In some embodiments, the discovered event sequences that may satisfy the target conditions may be included in the test results. Additionally or alternatively, in some embodiments, the test results may include one or more event sequence trees that may also illustrate the satisfaction of the target conditions by the discovered event sequences.

At block 712, a selected event sequence "Seq$_{sel}$" may be set as being equal to the event sequence "Seq." At block 713, the selected event sequence "Seq$_{sel}$" may be executed. At block 714, one or more event sequences "Seq$_{api}$" may be generated. In some embodiments, each event that may be available for execution in the current state of the software program may be selected may be appended to the selected event sequence "Seq$_{sel}$" to generate the event sequences "Seq$_{api}$." For example, as indicated above with respect to block 416 of method 400 of FIG. 4, with respect to the example of FIGS. 5A and 5B, the event sequences "e1" and "e2" may be available for execution when the event sequence "e1" may be "Seq$_{sel}$." Therefore, in this particular example, the event sequence "e1" may be appended with event sequences "e1" and "e2" to generate event sequences "e1→e1" and "e1→e2," which may be designated as event sequences "Seq$_{ap1}$" and "Seq$_{ap2}$," respectively. At block 716, the distances of the event sequences "Seq$_{api}$" may be determined with respect to the target conditions. For example, with respect to the example of FIGS. 5A and 5B, when the event sequence "e1→e1" is designated as event sequence "Seq$_{ap1}$" and the target conditions include the target conditions 523a-523d, the distances may be determined for the event sequence "e1→e1" with respect to the target conditions 523a-523d. Additionally, in this example, when the event sequence "e1→e2" is designated as event sequence "Seq$_{ap2}$" and the target conditions include the target conditions 523a-523d, the distances may be determined for the event sequence "e1→e2" with respect to the target conditions 523a-523d. Table 4 illustrates the distances that may be determined for event sequences "e1→e1" and "e1→e2." Additionally, in Table 4, the rows may be associated with the event sequences and the columns may be associated with the corresponding target conditions. The numbers in the cells may indicate the distance of the event of the corresponding row with respect to the target condition of the corresponding column.

TABLE 4

|  | Target Condition 523a | Target Condition 523b | Target Condition 523c | Target Condition 523d |
|---|---|---|---|---|
| e1→e1 | 7 | 4 | 3 | 2 |
| e1→e2 | 3 | 0 | 1 | 6 |

At block 718, it may be determined whether any of the distances of the event sequences "Seq$_{api}$" with respect to the target conditions are equal to "0." When one or more of the distances are equal to "0," the method 700 may proceed to block 720; otherwise, the method 700 may proceed to block 726. For example, with respect to the example of FIGS. 5A and 5B and Table 3, the method 700 may proceed to block 720 because the event sequence "e1→e2" may have a distance of "0" with respect to the target condition 523b.

At block 720, one or more of the event sequences "Seq$_{api}$" with a distance of "0" may be appended with the corresponding dependent event and the resulting event sequence may be executed. As indicated above, in some embodiments, the resulting event sequence may be deemed a discovered event sequence.

For example, with respect to the example of FIGS. 5A and 5B and Table 3, the event sequence "e1→e2" may have a distance of "0" and may thus be appended with the dependent event "e5." The resulting event sequence "e1→e2→e5" may be executed, which may allow for exploration of the path "b2$_5$." In some embodiments, the event sequence "e1→e2→e5" may thus be deemed a discovered event sequence with respect to the event set 518 and may be included in test results associated with the event set 518. Additionally, the event sequence "e1→e2→e5" may be deemed as covering the path "b2$_5$."

At block 722, explored path conditions may be removed from the target conditions. At block 724, it may be determined whether any target conditions associated with the corresponding dependent event are remaining. When target conditions are remaining, the method 700 may proceed to block 726. When no more target conditions are remaining, the method 700 may proceed to block 730.

At block 726, an event sequence "Seq$_{min}$" of the event sequences "Seq$_{api}$" associated with a smallest non-zero distance may be executed. In some instances, more than one event sequence may be associated with the same smallest non-zero distance. In these or other embodiments, any one of the event sequences may be executed.

For example, with respect to the example of FIGS. 5A and 5B and Table 3, the event sequence "e1→e2" may be executed as opposed to the event sequence "e1→e1" because the smallest distance associated with the event sequence "e1→e2" is smaller than the smallest distance associated with the event sequence "e1→e1." As such, for this particular example and iteration, the event sequence "e1→e2" may be considered the event sequence "Seq$_{min}$."

At block 728, the selected event sequence "Seq$_{sel}$" may be set as being equal to "Seq$_{min}$." Following block 728, the method 700 may return to block 714. In some embodiments, the event sequence "Seq$_{sel}$" may be discarded if its distance is greater than a predefined limit. In these instances, a previous sequence with a distance within the limit may be selected at block 728 as the selected event sequence "Seq$_{sel}$."

In some embodiments, an event may not be appended to the selected event sequence "Seq$_{sel}$" when doing so leads to a greater distance. For example, in some of embodiments, the Local Computation may include applying an alpha-beta pruning technique by analyzing the effect of a particular event to predict that it may be useless after some points. Specifically, if appending an event increases the distance monotonically, then no appending may be applied. By way of example, suppose the particular event increases the value of variable "i" by 4, and a particular target condition is i<4. In this particular example, any event sequence with i≥0 may not be appended to the particular event because the distance of the particular event with respect to the particular target condition would increase by doing so. This technique may thus avoid executing many useless event sequences in the Local Computation.

In some embodiments, the method 700 may repeat the operations of one or more of blocks 714, 716, 718, 720, 722, 724, 726, and 728 until there are no more target conditions remaining such that the method 700 may proceed to block 730 as described above. Therefore, in some embodiments, the operations of one or more of blocks 714, 716, 718, 720, 722, 724, 726, and 728 may be repeated until one or more event sequences that may satisfy the target conditions associated with the corresponding dependent event have been discovered. Further, in some embodiments, the method 700 may be performed iteratively with respect to each event sequence that may be included in the event set "S."

Therefore, the method 700 may be performed to explore the event space of the code under test such that execution of event sequences during the exploration may be prioritized according to distances, which may increase the efficiency of determining discovered event sequences as compared to other methods. Modifications, additions, or omissions may be made to the method 700 without departing from the scope of the present disclosure. For example, in some instances, the method 700 may be configured to terminate after a particular number of iterations have been performed even if an event sequence that covers a path of a corresponding target condition has not been found for all the target conditions.

Returning to flow 200 of FIG. 2, the Local Computation described with respect to method 700 may be more efficient than the Global Computation described with respect to method 400 because the Local Computation may add fewer new sequences to the event set "S." Specifically, the Local Computation picks the next "Seq" from the set of "$Seq_{api}$", while the Global Computation does so from the entire set of constructed event sequences. However, in some instances the Local Computation may not be able to discover an event sequence that satisfies a particular target condition. In contrast, the Global Computation may discover an event sequence for each target condition, but may be less efficient because of the constant change and updating to the event set "S."

For example, the Local Computation may select event sequences with a smallest distance at block 726 to generate event sequences that may be appended to determine a particular event sequence that satisfies a particular target condition. However, in some instances, selecting and appending event sequences with the smallest distance may not yield a particular event sequence that satisfies a particular target condition. In contrast, the Global Computation may not have the same problem because it adds to the event set "S" and continues to select from the event set "S." As such, in some instances, the Global Computation may be more complete than the Local Computation, but may also be less efficient than the Local Computation.

In some embodiments, the Mutation-based Combinational Computation may be performed with respect to operations similar to the Local Computation such that the Mutation-based Combinational Computation may act as a modification of the Local Computation. For example, instead of executing the event sequence "$Seq_{api}$" with the smallest distance (e.g., "$Seq_{min}$") at block 726 of method 700 of FIG. 7, the Mutation-based Combinational Computation may be performed to select another event sequence "$Seq_{api}$" for execution. Therefore, the Mutation-based Combinational Computation may not always select and execute the event sequences with the smallest distance such that the Mutation-based Combinational Computation may discover event sequences that satisfy path conditions that the Local Computation may not discover. However, the Mutation-based Combinational Computation may not be as expensive as the Global Computation.

Accordingly, in some instances, the Mutation-based Combinational Computation may be more complete than the Local Computation but less complete than the Global Computation. Additionally, the Mutation-based Combinational Computation may be more efficient than the Global Computation but less efficient than the Local Computation.

Figure 8A:
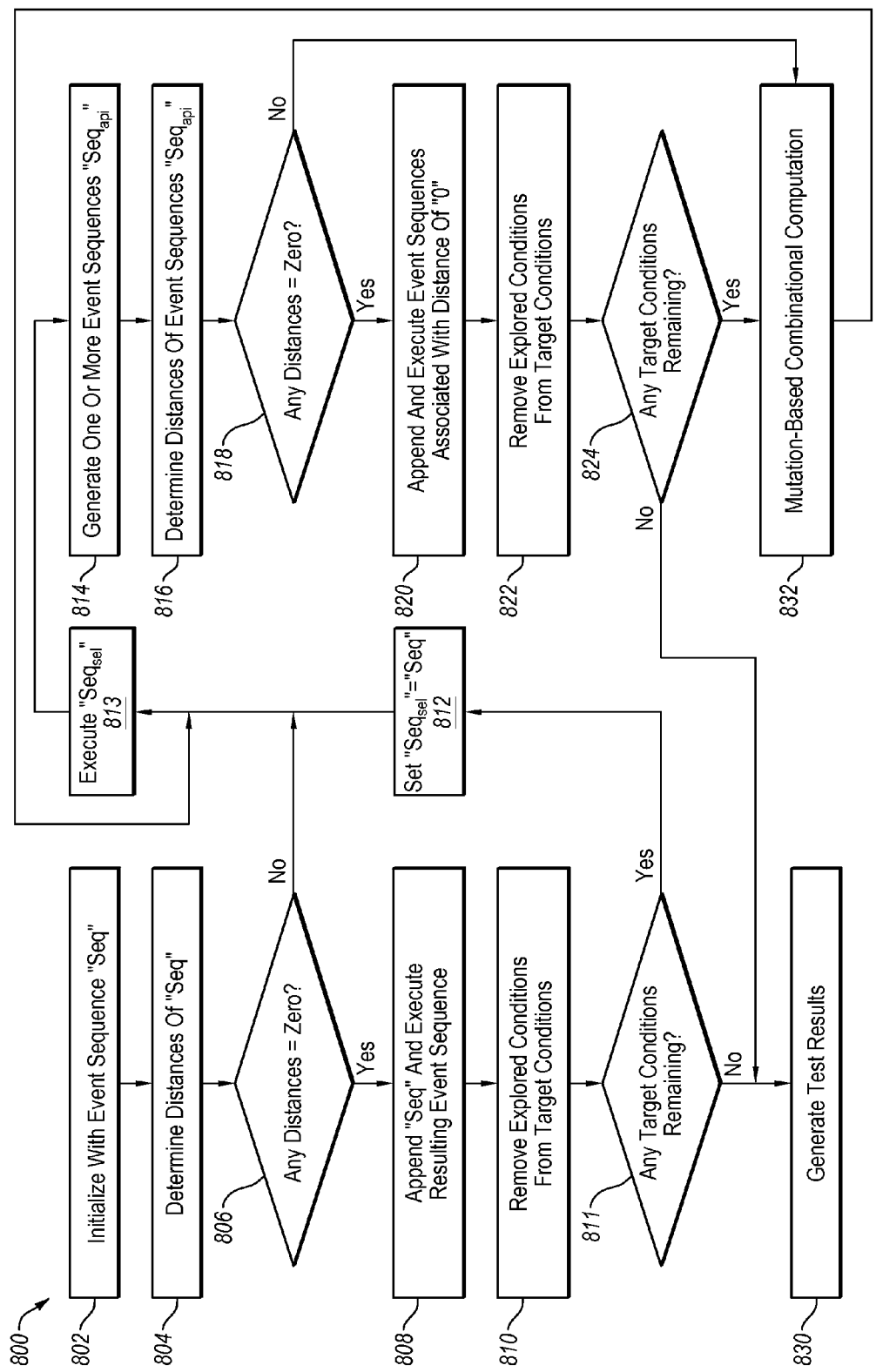
FIG. 8A is a flowchart of an example method 800 of a modification of the Local Computation of FIG. 7 that includes a Mutation-based Combinational Computation.

FIG. 8A is a flowchart of an example method 800 of a modification of the Local Computation of FIG. 7 that includes the Mutation-based Combinational Computation, according to at least one embodiment described herein. In some embodiments, one or more of the operations associated with the method 800 may be performed at block 232 of the flow 200. The method 800 may be performed by any suitable system, apparatus, or device. For example, the test module 106 of the electronic device 102 of FIG. 1B may perform one or more of the operations associated with the method 800. Although illustrated with discrete blocks, the steps and operations associated with one or more of the blocks of the method 800 may be divided into additional blocks, combined into fewer blocks, or eliminated, depending on the desired implementation.

The method 800 may include blocks 802, 804, 806, 808, 810, 811, 812, 813, 814, 816, 818, 820, 822, 824, and 830 which may include operations analogous to blocks 702, 704, 706, 708, 710, 711, 712, 713, 714, 716, 718, 720, 722, 724, and 730 respectively, of method 700 of FIG. 7 The method 800 may also include a block 832 that may include operations associated with the Mutation-based Combinational Computation. In the illustrated example, the block 832 may be included in the method 800 in place of the blocks 726 and 728 in the method 700.

At block 832, an event sequence may be selected from an event sequence set work list "W" as the event sequence "$Seq_{sel}$" that may be used with respect to the operations of blocks 813, 814, 816, 818, 820, 822, 824 and 830. The event sequence that may be selected as the event sequence "$Seq_{sel}$" may be selected based on a mutation probability of the Mutation-based Combinational Computation, which may not necessarily select the event sequence of the work list "W" with the smallest distance as the event sequence "$Seq_{sel}$."

In some embodiments, the Mutation-based Combinational Computation may determine whether or not to select an event sequence "$Seq_{api}$" of the work list "W" to be "$Seq_{sel}$" based on a probabilistic determination. The probabilistic determination may be based on any applicable Mutation-based Combinational Computation, such as a simulated annealing (SA) computation, a genetic algorithm, a tabu search, a particle swarm optimization, etc. By selecting which event sequence "$Seq_{api}$" may be the event sequence "$Seq_{sel}$" based on the probabilistic determination instead of the smallest distance, the Mutation-based Combinational Computation may discover event sequences that satisfy path conditions that the Local Computation may not discover in some instances.

In some embodiments, the method 800 may repeat the operations of one or more of blocks 813, 814, 816, 818, 820, 822, 824, and 832 until there are no more target conditions remaining such that the method 800 may proceed to block 830. Therefore, in some embodiments, the operations of one or more of blocks 813, 814, 816, 818, 820, 822, 824, and 832 may be repeated until one or more event sequences that may satisfy the target conditions associated with a corresponding dependent event have been discovered.

Figure 8B:
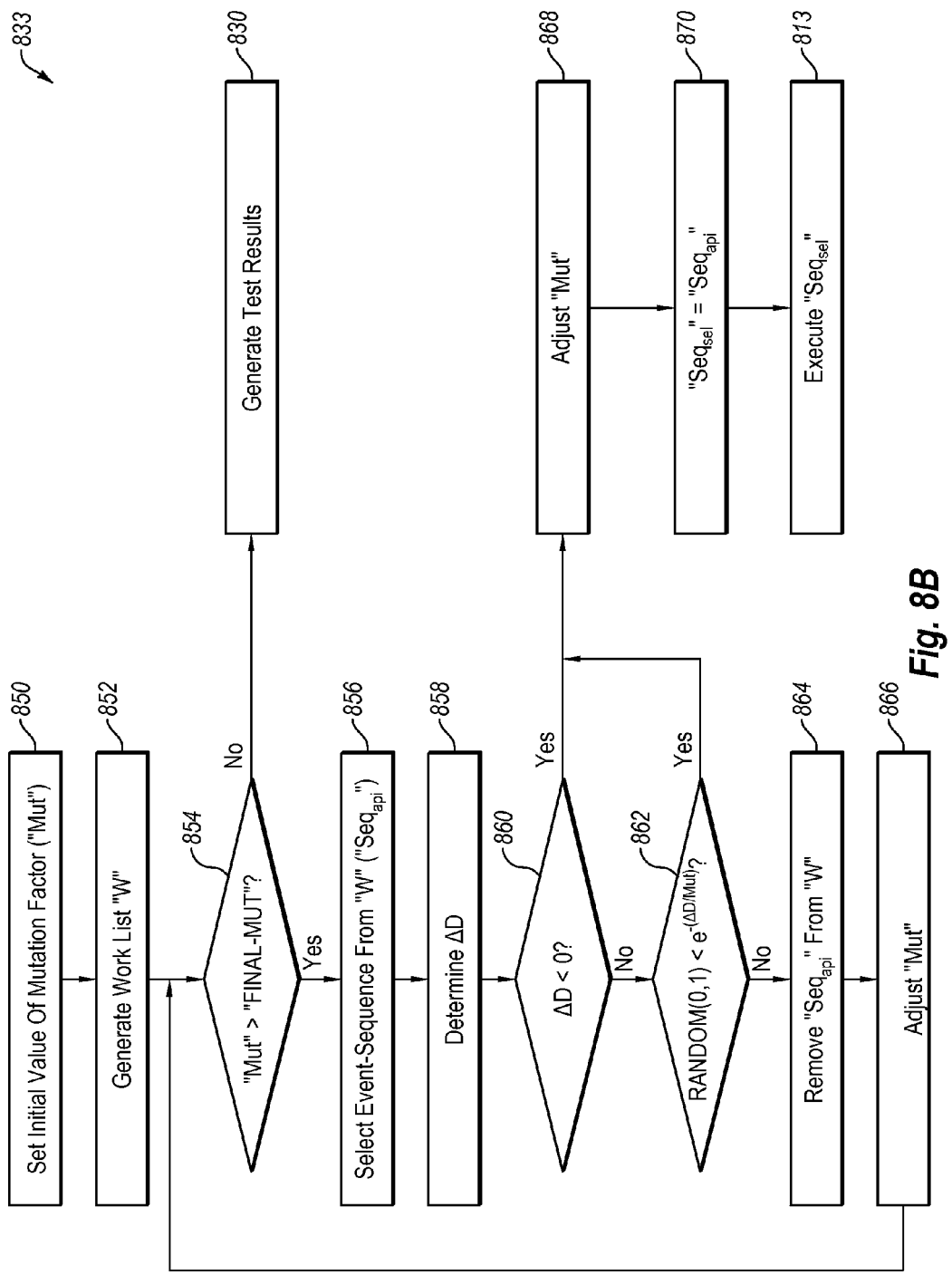
FIG. 8B is a flowchart that includes an example Simulated Annealing Computation that may be used for the Mutation-based Combinational Computation of FIG. 8A.

FIG. 8B is a flowchart that includes an example SA Computation 833 that may be used for the Mutation-based Combinational Computation of block 832 of FIG. 8A, according to at least one embodiment described herein. Although illustrated with discrete blocks, the steps and operations associated with one or more of the blocks of the FIG. 8B may be divided into additional blocks, combined into fewer blocks, or eliminated, depending on the implementation.

The SA Computation 833 may begin at block 850 where an initial value of a mutation factor "Mut" may be set. The mutation factor "Mut" may be a factor that influences the likelihood that an event sequence that is not associated with the smallest distance is selected to be the event sequence "$Seq_{sel}$" with respect to blocks 813, 814, 816, 818, 820, 822, and 824 of FIG. 8A. For example, as detailed below, in the present example, the larger the mutation factor "Mut" is, the more likely that an event sequence that is not associated with the smallest distance is selected to be the event sequence "$Seq_{sel}$." Therefore, the initial value of the mutation factor "Mut" may be set according to a target mutation rate which may be a rate at which an event sequence that is not associated with the smallest distance is selected to be the event sequence "$Seq_{sel}$."

At block 852, a work list "W" may be generated. In some embodiments, the work list "W" may be generated to include the event sequences "$Seq_{api}$" that may be generated at block 814 of method 800 of FIG. 8A. As mentioned above, in some instances, the operations of one or more of blocks 813, 814, 816, 818, 820, 822, 824, and 832 of method 800 may be performed more than once. In some embodiments, when block 832 is encountered a subsequent time, the current event sequences "$Seq_{api}$" may be different from the previous event sequences "$Seq_{api}$." In some of these instances, the work list "W" may be generated to include the current event sequences "$Seq_{api}$" but not the previous event sequences "$Seq_{api}$."

At block 854, it may be determined whether the mutation factor "Mut" is greater than a final target value "Final-Mut" of the mutation factor "Mut." As described below, in the example embodiment, the mutation factor "Mut" may be adjusted from its initial value during the SA Computation 833 such that it may be different during a subsequent iteration of the SA Computation 833. When the mutation factor "Mut" has moved beyond the final target value "Final-Mut," a target amount of iterations may have been performed with respect to the SA Computation 833 the SA Computation 833 may finish, and operations of block 830 of the method 800 may be performed. In the illustrated example, it may be determined whether the mutation factor "Mut" is greater than the final target value "Final-Mut" because in the specific example, the mutation factor "Mut" may decrease with each iteration of the SA Computation 833. However, in some embodiments, it may be determined whether the mutation factor "Mut" is less than the final target value "Final-Mut" depending on the implementation and configuration of the SA Computation 833.

At block 856, an event sequence "$Seq_{api}$" may be selected from the work list "W." In some embodiments, the event sequence "$Seq_{api}$" may be selected based on its position within the work list "W." For example, the event sequence "$Seq_{api}$" may be the first event sequence in the work list "W." Additionally or alternatively, the order of the event sequences "$Seq_{api}$" in the work list "W" may or may not be random.

At block 858, a distance difference "ΔD" may be determined. In some embodiments, the distance difference "ΔD" may be the difference between the distance associated with the event sequence "$Seq_{api}$" and the distance associated with a previous event sequence "$Seq_{sel}$" that may have been previously selected from the work list "W."

For example, in some instances, the current selected sequence may be "$Seq_{sel}$", and "$Seq_{api}$" may be the first sequence in the work list "W". In such instances, the distance difference "ΔD" may be determined as the distance associated with the second event sequence "$Seq_{api}$" minus the distance associated with the first event sequence "$Seq_{sel}$."

However, in some instances the event sequence "$Seq_{api}$" may be the first event sequence selected from the work list "W" such that a previously selected event sequence "$Seq_{api}$" and associated distance may not be applicable or available. Therefore, in some embodiments, when the event sequence "$Seq_{api}$" is the first event sequence selected from the work list "W," the distance difference "ΔD" may be deemed as the distance associated with the event sequence "$Seq_{api}$."

At block 860, it may be determined whether the distance difference "ΔD" is less than "0." When the distance difference "ΔD" is less than "0," which indicates the second event sequence "$Seq_{api}$" is better than the currently selected sequence "$Seq_{sel}$" in terms of the distance, the SA Computation 833 may proceed to block 868. When the distance difference "ΔD" is not less than "0," the SA Computation 833 may proceed to block 862.

At block 868, the mutation factor "Mut" may be adjusted. In the illustrated example, the mutation factor "Mut" may be adjusted to decrease such that the mutation rate may decrease for a subsequent iteration of the SA Computation 833. In other embodiments, the mutation factor "Mut" may increase with respect to each iteration such that the mutation rate may increase for a subsequent iteration of the SA Computation 833. At block 870, the event sequence "$Seq_{api}$" may be selected to be the event sequence "$Seq_{sel}$" when the SA Computation 833 may finish, and operations of block 813 of method 800 may be performed. After that, the computation goes back to block 854.

At block 862 a probabilistic determination may be made to determine whether or not to select the event sequence "$Seq_{api}$" to be the event sequence "$Seq_{sel}$." In the illustrated example, a random number "y" between "0" and "1" may be selected (e.g., "y=RANDOM(0,1)") and may be compared against a number "x" determined from the expression "$x = e^{-(\Delta D/Mut)}$." When "x" is greater than "y," the event sequence "$Seq_{api}$" may be selected to be the event sequence "$Seq_{sel}$," such that the SA Computation 833 may proceed to blocks 868 and 870 described above. When "x" is less than "y," the event sequence "$Seq_{api}$" may not be selected to be the event sequence "$Seq_{sel}$," and the SA Computation 833 may proceed to block 864.

By an example, suppose the current selected event sequence "$Seq_{sel}$" has a distance of "1," and the event sequence "$Seq_{api}$" has a distance of "4," the distance difference "ΔD" may be "4−1=3." Although "Seq$_{api}$" has a greater distance, the SA Computation may still select it as the next sequence depending on the probability calculation. For example, suppose "y=RANDOM(0,1)=0.5," and "Mut=9.9," then "x=e$^{-(\Delta D/Mut)}$=e$^{-(3/9.9)}$=0.74." Since "0.5" is less than "0.74," the SA Computation may select this "Seq$_{api}$" as the next "Seq$_{sel}$".

In the illustrated example, the expression "x=e$^{-(\Delta D/Mut)}$" is such that as the mutation factor "Mut" increases, the value of "x" may move closer to "1." Therefore, the likelihood that the event sequence "Seq$_{api}$" may be selected to be the event sequence "Seq$_{sel}$," may increase as the mutation factor "Mut" increases in the illustrated example such that the mutation rate may increase as the mutation factor "Mut" increases. Conversely, the expression "x=e$^{-(\Delta D/Mut)}$" is such that as the mutation factor "Mut" decreases, the value of "x" may move closer to "0." Therefore, the likelihood that the event sequence "Seq$_{api}$" may be selected to be the event sequence "Seq$_{sel}$," may decrease as the mutation factor "Mut" decreases in the illustrated example such that the mutation rate may decrease as the mutation factor "Mut" decreases. However, in other embodiments, the expressions associated with "x" and "y" and/or the comparison between "x" and "y" may be such that as the mutation factor increases, the mutation rate may decrease and such that as the mutation factor decreases, the mutation rate increases.

At block 864, the event sequence "Seq$_{api}$" of the work list "W" may be removed from the work list "W." The current selected event sequence is still "Seq$_{sel}$". At block 866, the mutation factor "Mut" may be adjusted in an analogous manner as adjustment to the mutation factor "Mut" that may be performed with respect to block 868. Following block 866, the SA Computation may return to block 854. In some embodiments, one or more operations associated with blocks 854, 856, 858, 860, 862, 864, and 866 may be repeated until all targets are covered or a predefined bound is reached.

Therefore, the method 800 may be performed to explore the event space of the code under test such that execution of event sequences during the exploration may be prioritized according to distances and a probability computation, such as the SA Computation 833. Modifications, additions, or omissions may be made to the method 800 and/or the SA Computation 833 of FIGS. 8A and 8B without departing from the scope of the present disclosure. For example, in some embodiments, the mutation factor "Mut" may not be adjusted such that one or more of blocks 854, 866, and 868 may be omitted. Further, the order of execution of the blocks may vary according to different implementations. Additionally, as indicated above, the SA Computation 833 of FIG. 8B and its associated blocks and operations are merely an example implementation of the Mutation-based Combinational Computation that may be performed at block 832 of FIG. 8A.

One skilled in the art will appreciate that, for the flow 200, the method 400, the method 700, the method 800, and the SA Computation 833, and other processes and methods disclosed herein, the functions performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

As indicated above, the embodiments described herein may include the use of a special purpose or general purpose computer (e.g., the processor 110 of FIG. 1B) including various computer hardware or software modules, as discussed in greater detail below. Further, as indicated above, embodiments described herein may be implemented using computer-readable media (e.g., the memory 112 of FIG. 1B) for carrying or having computer-executable instructions or data structures stored thereon.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    determining a first event sequence of an event-driven software application, the first event sequence including a first variable set;
    determining a second event sequence of an event-driven software application, the second event sequence including a second variable set;
    identifying a dependent event of the first event sequence and the second event sequence, the dependent event including a target condition that includes one or more variables in the first variable set and the second variable set;
    determining a first distance for the first event sequence that indicates a degree to which execution of the first event sequence satisfies the target condition;
    determining a second distance for the second event sequence that indicates the degree to which execution of the second event sequence satisfies the target condition;
    prioritizing execution of the first event sequence over the second event sequence based on the first distance and the second distance indicating that execution of the first event sequence satisfies the target condition to a higher degree than execution of the second event sequence; and
    exploring, according to the prioritization, an event space that includes one or more of the first event sequence, the second event sequence, and the dependent event.

2. The method of claim 1, wherein the first variable set and the second variable set correspond to the same set of variables.

3. The method of claim 1, wherein the first variable set and the second variable set correspond to different variables.

4. The method of claim 1, further comprising executing the first event sequence followed by executing the dependent event when the first distance indicates that execution of the first event sequence satisfies the target condition.

5. The method of claim 1, further comprising executing the first event sequence over the second event sequence based on the first distance and the second distance indicating that execution of the first event sequence satisfies the target condition to a higher degree than execution of the second event sequence.

6. The method of claim 1, further comprising:
    determining a first set of event sequences that includes the first event sequence and the second event sequence;
    appending, based on the first distance, the first event sequence to each event sequence of the first set of event sequences to generate a second set of event sequences;
    adding the second set of event sequences to the first set of event sequences to generate a third set of event sequences;
    determining, for each event sequence of the third set of event sequences, an event sequence distance with respect to the target condition;
    prioritizing execution of the event sequences of the third set of event sequences based on the event sequence distances; and
    exploring, according to the prioritization of execution, an event space that includes the third set of event sequences and the dependent event.

7. The method of claim 1, wherein the target condition includes a numeric constraint and the method further comprises:
    determining one or more intervals for the target condition; and
    determining the first distance and the second distance based on the one or more intervals.

8. The method of claim 1, wherein the target condition includes a string constraint and the method further comprises:
    determining one or more character automata for the target condition; and
    determining the first distance and the second distance based on the one or more character automata.

9. A method comprising:
    determining a plurality of event sequences of an event-driven software application based on each of the plurality of event sequences including at least one variable of one or more target conditions of one or more corresponding dependent events of the event-driven software application;
    determining, for each event sequence of the plurality of event sequences, a distance with respect to each of the one or more target conditions of the event-driven software application, the event sequence distance indicating a degree to which execution of its corresponding event sequence satisfies a corresponding target condition;
    prioritizing execution of the plurality of event sequences based on the event sequence distances; and
    exploring, according to the prioritization of execution, an event space that includes one or more of the plurality of event sequences and a dependent event that corresponds to the one or more target conditions.

10. The method of claim 9, wherein the one or more target conditions each include a numeric constraint and the method further comprises:
    determining one or more intervals for each of the one or more target conditions; and
    determining the event sequence distances based on the one or more intervals.

11. The method of claim 9, wherein the one or more target conditions each include a string constraint and the method further comprises:
    determining one or more character automata for each of the one or more target conditions; and
    determining the event sequence distances based on the one or more character automata.

12. The method of claim 9, further comprising adjusting the prioritization of execution of the plurality of event sequences based on a combinational computation.

13. The method of claim 12, wherein the combinational computation includes a local search-based combinational computation, global search-based combinational computation, a mutation-based combinational computation, or any combination thereof.

14. The method of claim 13, wherein the mutation-based combinational computation includes a simulated annealing (SA) computation, a genetic computation, a tabu search, a particle swarm optimization computation, or any combination thereof.

15. One or more non-transitory computer-readable storage media including computer-executable instructions configured to cause a system to perform operations, the operations comprising:
- determining a plurality of event sequences of an event-driven software application based on each of the plurality of event sequences including at least one variable of one or more target conditions of one or more corresponding dependent events of the event-driven software application;
- determining, for each event sequence of the plurality of event sequences, a distance with respect to each of the one or more target conditions of the event-driven software application, the event sequence distance indicating a degree to which execution of its corresponding event sequence satisfies a corresponding target condition;
- prioritizing execution of the plurality of event sequences based on the event sequence distances; and
- exploring, according to the prioritization of execution, an event space that includes one or more of the plurality of event sequences and a dependent event that corresponds to the one or more target conditions.

16. The one or more non-transitory computer-readable storage media of claim 15, wherein the one or more target conditions each include a numeric constraint and the operations further comprise:
- determining one or more intervals for each of the one or more target conditions; and
- determining the event sequence distances based on the one or more intervals.

17. The one or more non-transitory computer-readable storage media of claim 15, wherein the one or more target conditions each include a string constraint and the operations further comprise:
- determining one or more character automata for each of the one or more target conditions; and
- determining the event sequence distances based on the one or more character automata.

18. The one or more non-transitory computer-readable storage media of claim 15, wherein the operations further comprise adjusting the prioritization of execution of the plurality of event sequences based on a combinational computation.

19. One or more non-transitory computer-readable storage media including computer-executable instructions configured to cause a system to perform operations, the operations comprising:
- determining a first event sequence of an event-driven software application, the first event sequence including a first variable;
- determining a second event sequence of an event-driven software application, the second event sequence including a second variable;
- identifying a dependent event of the first event sequence and the second event sequence, the dependent event including a target condition that includes on one or more of the first variable and the second variable;
- determining a first distance for the first event sequence that indicates a degree to which execution of the first event sequence satisfies the target condition;
- determining a second distance for the second event sequence that indicates the degree to which execution of the second event sequence satisfies the target condition;
- prioritizing execution of the first event sequence over the second event sequence based on the first distance and the second distance indicating that execution of the first event sequence satisfies the target condition to a higher degree than execution of the second event sequence; and
- exploring, according to the prioritization, an event space that includes one or more of the first event sequence, the second event sequence, and the dependent event.

20. The one or more non-transitory computer-readable storage media of claim 19, wherein the operations further comprise executing the first event sequence over the second event sequence based on the first distance and the second distance indicating that execution of the first event sequence satisfies the target condition to a higher degree than execution of the second event sequence.

* * * * *